US007896738B2

(12) United States Patent
Okada

(10) Patent No.: US 7,896,738 B2
(45) Date of Patent: *Mar. 1, 2011

(54) SLOT MACHINE AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 944 days.

This patent is subject to a terminal disclaimer.

(21) Appl. No.: 11/806,149

(22) Filed: May 30, 2007

(65) Prior Publication Data

US 2008/0096637 A1 Apr. 24, 2008

Related U.S. Application Data

(60) Provisional application No. 60/852,401, filed on Oct. 18, 2006.

(51) Int. Cl.
*G06F 17/00* (2006.01)

(52) U.S. Cl. .......................................................... 463/20

(58) Field of Classification Search ............. 463/16–25
See application file for complete search history.

(56) References Cited

U.S. PATENT DOCUMENTS

| | | | | |
|---|---|---|---|---|
| 6,604,999 | B2 | 8/2003 | Ainsworth | |
| 7,618,315 | B2 * | 11/2009 | Thomas et al. | 463/20 |
| 7,744,458 | B2 * | 6/2010 | Marks et al. | 463/20 |
| 2002/0055382 | A1 * | 5/2002 | Meyer | 463/20 |
| 2002/0065124 | A1 | 5/2002 | Ainsworth | |
| 2002/0094862 | A1 * | 7/2002 | Inoue | 463/20 |

FOREIGN PATENT DOCUMENTS

| | | |
|---|---|---|
| JP | 2002-078855 | 3/2002 |

* cited by examiner

*Primary Examiner*—Ronald Laneau
(74) *Attorney, Agent, or Firm*—NDQ&M Watchstone LLP

(57) ABSTRACT

When the number of bets is determined and a game is started, reels start spinning. After a lapse of a predetermined time, fifteen symbols are repositioned in symbol display regions. Particularly, in case a “RED7” symbol or a “BLUE7” symbol is included in the repositioned symbols, an animation effect to represent a volcanic eruption of a volcano, a performance character, and a sound effect corresponding to a volcanic eruption sound of the volcano are outputted by dragging and dropping the “RED7” symbol or “BLUE7” symbol to a crater of the volcano.

18 Claims, 15 Drawing Sheets

| HITS |  |  |  |  |  |  |  |
|---|---|---|---|---|---|---|---|
| X X X X X | 500 +BONUS | 250 | 250 | 50 | 50 | 20 | 20 |
| X X X X | 100 +BONUS | 25 | 25 | 10 | 10 | 5 | 5 |
| X X X | 20 +BONUS | 10 | 10 | 4 | 4 | 4 | 4 |

SLOT MACHINE AND PLAYING METHOD THEREOF

CROSS-REFERENCE TO THE RELATED APPLICATION (S)

This application is based upon and claims a priority from the U.S. provisional Patent Application No. 60/852,401 filed on Oct. 18, 2006, the entire contents thereof are incorporated herein by reference.

BACKGROUND OF THE INVENTION

1. Field of the Invention

The present invention relates to a slot machine and a playing method thereof in which an animation effect is outputted in case a repositioned symbol is dragged and dropped by a specific character.

2. Description of Related Art

In a conventional slot machine, a game is started by inserting gaming media such as coins or the like into a gaming machine. Once a game is started, symbol varying and displaying is carried out at respective symbol columns laid out in a predetermined region, and stop symbol varying and displaying is sequentially carried out after a lapse of a predetermined time. In case a resultant symbol combination coincides with a winning symbol combination, a prize is awarded.

As to the matter on whether or not a symbol combination coincides with a winning symbol combination, a judgment is generally made based on criteria such like whether or not a predetermined number of identical symbols (e.g., "CHERRY", "7", and the like) are positioned on a previously defined pay line. Other than the above criteria, there have conventionally been defined prizes to be awarded in case a predetermined number or more of identical symbols are displayed in certain positioning manner regardless of whether on a pay line or not.

For example, U.S. Pat. No. 6,604,999B2 and US Patent Application Publication No. 2002/0065124A1 disclose slot machines in which video reels are used and fifteen symbols are displayed in a form of 3 rows×5 columns matrix. In the conventional slot machines, when a game is started, there will be carried out the following operations: spinning of reels is started; symbols in a same column are linked and symbol varying and displaying is carried out at each of the five columns; and when spinning of the reels is stopped along a lapse of a predetermined time, three-symbol are stopped and displayed in each of the five columns. In case a symbol combination consisting of a predetermined number or more of identical symbols is stopped and displayed on a pay line, a prize is awarded.

SUMMARY OF THE INVENTION

The object of the present invention is to provide a slot machine and play method thereof which has new entertaining factors which conventional ones did not have inherently.

Therefore, in order to achieve the object, according to a first aspect of the present invention, there is provided a slot machine comprising: a display for displaying plural symbols positioned and a performance character; and a controller programmed to operate with the display (a) to reposition the plural symbols in the display, (b) to award a prize in accordance with a combination of repositioned symbols, and (c) to output an animation effect when a repositioned symbol is dragged and dropped to the performance character.

Furthermore, according to a second aspect of the present invention, there is provided a slot machine comprising: a display for displaying plural symbols positioned and a performance character; and a controller programmed to operate with the display (a) to reposition plural symbols in the display, except a specific symbol to be positioned in a predetermined location, (b) to indicate at least one symbol character whose look is same as or similar to one of any symbols which can possibly be positioned in the display with a symbol of the at least one symbol character indistinguishable, (c) to output an animation effect when the at least one symbol character is dragged and dropped to the performance character, and to reposition the specific symbol in the predetermined location laid out in the display, and (d) to award a prize in accordance with a combination of repositioned symbols.

Furthermore, according to a third aspect of the present invention, there is provided a slot machine comprising: a display for displaying plural symbols positioned and a performance character; and a controller programmed to operate with the display (a) to reposition plural symbols in the display, except a specific symbol to be positioned in a predetermined location, (b) to indicate at least one symbol character whose look is same as or similar to one of any symbols which can possibly be positioned in the display with a symbol of the at least one symbol character indistinguishable, (c) to output an animation effect when the at least one symbol character is dragged and dropped to the performance character, and to indicate the at least one symbol character in the display with a symbol of the at least one symbol character distinguishable, (d) to move the at least one symbol character whose symbol is made distinguishable to the predetermined location, (e) to reposition the specific symbol in the predetermined location laid out in the display, and (f) to award a prize in accordance with a combination of repositioned symbols.

Furthermore, according to a fourth aspect of the present invention, there is provided a slot machine comprising: a display for displaying plural symbols positioned and a performance character; and a controller programmed to operate with the display (a) to carry out a lottery to decide symbols to be repositioned in the display, (b) in case a result of the lottery is to position symbols which make up a winning symbol combination to which a prize is awarded, to reposition plural symbols of the winning symbol combination in the display, except a specific symbol to be positioned in a predetermined location, (c) to indicate at least one symbol character whose look is same as or similar to one of any symbols which can possibly be positioned in the display with a symbol of the at least one symbol character indistinguishable, (d) to output an animation effect which differs depending on value of prize to be awarded when a specific symbol character whose look is same as or similar to the specific symbol is dragged and dropped to the performance character, and to indicate the specific symbol character in the display with a symbol of the specific symbol character distinguishable, (e) to move the specific symbol character whose symbol is made distinguishable to the predetermined location, (f) to reposition the specific symbol in the predetermined location laid out in the display, and (g) to award a prize in accordance with a combination of repositioned symbols.

Furthermore, according to a fifth aspect of the present invention, there is provided a playing method of a slot machine in which a controller repeats a game to reposition plural symbols currently positioned in a display and a performance character is indicated in the display, the playing method comprising the steps of: (a) repositioning the plural symbols in the display during the game with the controller; (b) awarding a prize in accordance with a combination of repositioned symbols with the controller; and (c) outputting an animation effect with the game controller when a repositioned symbol is dragged and dropped to the performance character.

Furthermore, according to a sixth aspect of the present invention, there is provided a playing method of a slot machine in which a controller repeats a game to reposition plural symbols currently positioned in a display and a performance character is indicated in the display, the playing method comprising the steps of: (a) repositioning plural symbols in the display during the game with the controller, except a specific symbol to be positioned in a predetermined location; (b) indicating at least one symbol character whose look is same as or similar to one of any symbols which can possibly be positioned in the display with a symbol of the at least one symbol character indistinguishable with the controller; (c) outputting an animation effect when the at least one symbol character is dragged and dropped to the performance character, and repositioning the specific symbol in the predetermined location laid out in the display with the controller, and (d) awarding a prize in accordance with a combination of repositioned symbols with the controller.

Furthermore, according to a seventh aspect of the present invention, there is provided a playing method of a slot machine in which a controller repeats a game to reposition plural symbols currently positioned in a display and a performance character is indicated in the display, the playing method comprising the steps of: (a) repositioning plural symbols in the display during the game with the controller, except a specific symbol to be positioned in a predetermined location; (b) indicating at least one symbol character whose look is same as or similar to one of any symbols which can possibly be positioned in the display with a symbol of the at least one symbol character indistinguishable with the controller; (c) outputting an animation effect when the at least one symbol character is dragged and dropped to the performance character, and indicating the at least one symbol character in the display with a symbol of the at least one symbol character distinguishable with the controller; (d) moving the at least one symbol character whose symbol is made distinguishable to the predetermined location; (e) repositioning the specific symbol in the predetermined location laid out in the display with the controller; and (f) awarding a prize in accordance with a combination of repositioned symbols with the controller.

Furthermore, according to an eighth aspect of the present invention, there is provided A playing method of a slot machine in which a controller repeats a game to reposition plural symbols currently positioned in a display and a performance character is indicated in the display, the playing method comprising the steps of: (a) carrying out a lottery to decide symbols to be repositioned in the display during the game with the controller; (b) in case a result of the lottery is to position symbols which make up a winning symbol combination to which a prize is awarded, repositioning plural symbols of the winning symbol combination in the display with the controller, except a specific symbol to be positioned in a predetermined location; (c) indicating at least one symbol character whose look is same as or similar to one of any symbols which can possibly be positioned in the display with a symbol of the at least one symbol character indistinguishable; (d) outputting an animation effect which differs depending on value of prize to be awarded when a specific symbol character whose look is same as or similar to the specific symbol is dragged and dropped to the performance character, and indicating the specific symbol character in the display with a symbol of the specific symbol character distinguishable with the controller; (e) moving the specific symbol character whose symbol is made distinguishable to the predetermined location; (f) repositioning the specific symbol in the predetermined location laid out in the display with the controller; and (g) awarding a prize in accordance with a combination of repositioned symbols with the controller.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Here will be described first through third embodiments of the inventive slot machine by referring to drawings. It is to be noted that slot machines directed the first through third embodiments are individually equipped with an image display apparatus such as liquid crystal display or the like, and they are so-called video-type slot machines which make their image display apparatuses display images of various symbols for playing a game.

First Embodiment

Figure 1:
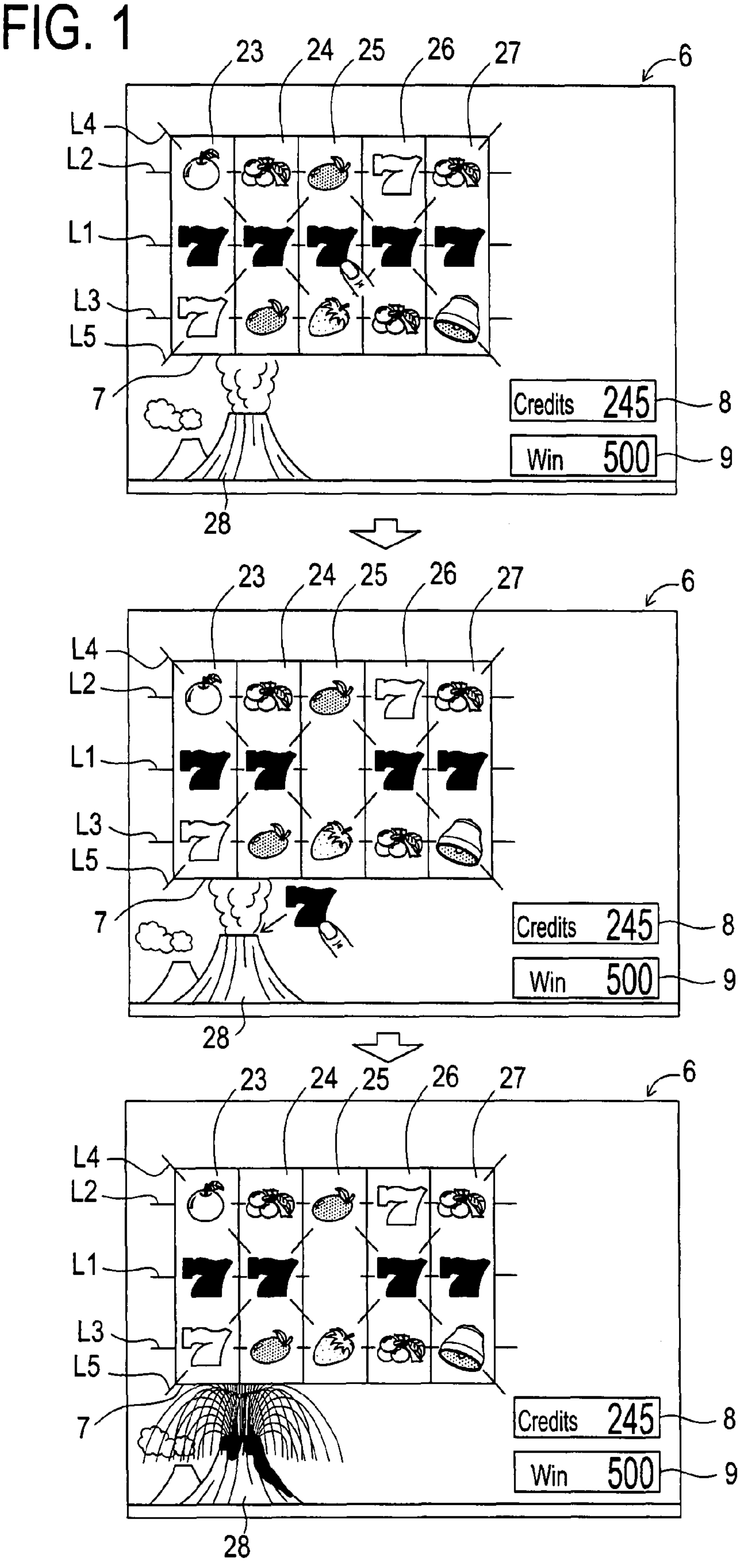
FIG. 1 is a diagram for illustrating a feature of typical game developments directed to a first embodiment that may be encountered in accordance with the principles of the present invention.

There will be described a feature of a slot machine directed to the first embodiment by referring to FIG. 1. FIG. 1 is a diagram for illustrating a feature of typical game developments directed to the first embodiment that may be encountered in accordance with the principles of the present invention. In the slot machine directed to the first embodiment, as shown in FIG. 1, a lower-side image display panel 6 displays: a symbol display frame 7 in which fifteen symbols are positioned in a form of 3 rows×5 columns matrix; and a volcano 28 which is a performance character. In this regard, in the symbol display frame 7, there are arranged five columns of symbol display regions each of which is to position three of many symbols depicted on a reel band of a reel. That is, three symbol display regions are assigned to each of five reels 23 through 27. In each of the symbol display regions, one of symbols depicted on respective reel bands of the reels 23 through 27 is positioned. Furthermore, five pay lines L1, L2, L3, L4, and L5 are provided on the symbol display frame 7 laid-out in the lower-side image display panel 6. Furthermore, various winning symbol combinations are previously defined.

In every base game carried out by the slot machine directed to the first embodiment, a start button is operated by a player, whereby some or all of the five pay lines L1, L2, L3, L4, and L5 is/are activated depending on the number of bets. Consequently, each of the reels virtually spins and stops spinning in each of the symbol display regions within the symbol display frame 7, whereby a single symbol is repositioned in each of the symbol display regions. In case a combination of five symbols repositioned on one of activated pay lines L1 through L5 within the symbol display frame 7 coincides with a winning symbol combination, a prize for the winning symbol combination is awarded to a player.

Furthermore, in case a "RED7" symbol or a "BLUE7" symbol is included in repositioned symbols, a player can drag and drop the above specific symbol to a crater of the volcano 28, the performance character, whereby an animation effect to represent a volcanic eruption of the volcano 28 and a sound effect corresponding to a volcanic eruption sound of the volcano 28 are outputted.

Figure 2:
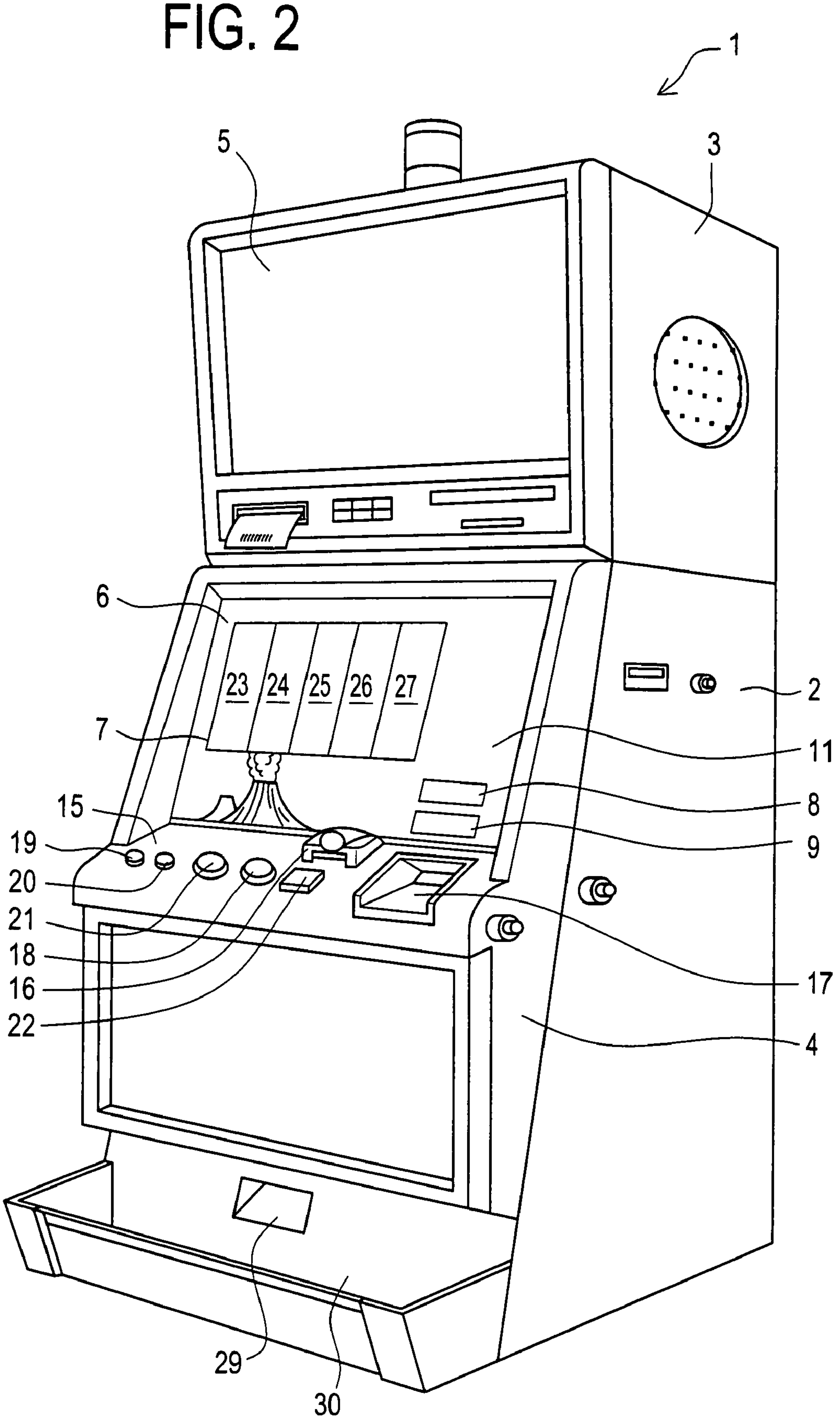
FIG. 2 is a perspective view showing an outline construction of the slot machine.

There will be described schematic structure of a slot machine 1 directed to the first embodiment by referring to FIG. 2. FIG. 2 is a perspective view showing an outline construction of the slot machine 1.

The slot machine 1 directed to the first embodiment includes: a cabinet 2; a top box 3 provided above of the cabinet 2; and a main door 4 provided on a front face of the cabinet 2.

An upper-side image display panel 5 is provided on a front face of the top box 3. The upper-side image display panel 5 is structured with a well-known crystal liquid panel which usually displays demonstration animation, information about the slot machine 1 such as game rules, a prize table, and the like.

A lower-side image display panel 6 is provided on the main door 4.

The lower-side image display panel 6 is structured with a well-known crystal liquid panel, and a symbol display frame 7 with a 3 rows×5 columns matrix-formed symbol display regions is provided there. The symbol display frame 7 consists of five columns for reels 23 through 27. Each of the reels 23 through 27 is a symbol column of which arrangement order of symbols is predefined. When a game is started, each of the reels 23 through 27 spins, stops spinning and displays three symbols after a lapse of a predetermined time. Consequently, as described later, fifteen symbols at most are positioned in the symbol display frame 7 depending on game progress, and if a combination of the positioned symbols coincides with a winning symbol combination, a prize for the winning symbol combination is awarded to a player.

Further on, in the slot machine 1 directed to the first embodiment, the volcano 28 as performance character is displayed below the symbol display frame 7. In case there is included a "RED7" symbol or a "BLUE7" symbol in symbols repositioned in the symbol display frame 7 and the above specific symbol is dragged and dropped to the crater of the volcano 28, an animation effect to represent a volcanic eruption of the volcano 28 is outputted to the lower-side image display panel 6. At the same time, a sound effect corresponding to a volcanic eruption sound of the volcano 28 is outputted from a speaker.

Furthermore, a touch panel 11 is provided on a front face of the lower-side image display panel 6, whereby a player can input various instructions such as designating a symbol and a symbol display region, dragging and dropping a designated symbol, and the like with the touch panel 11.

Furthermore, a credit amount display section 8 and a prize amount display section 9 are provided in the lower-side image display panel 6. The credit amount display section 8 displays amount of credits the player currently holds. The prize amount display section 9 displays: contents of prizes to be awarded in case a combination of repositioned symbols coincides with a winning symbol combination; and contents of prizes won by a bonus game.

Below the lower-side image display panel 6, there are provided: a control panel 15 which consists of: plural buttons with which a player inputs instructions concerning game progress; a coin insertion slot 16 for accepting coins, the gaming media, into the cabinet 2; and a bill validator 17.

The control panel 15 includes: a start button 18; a change button 19; a CASHOUT button 20; a 1-BET button 21; and a MAX-BET button 22. The start button 18 is operation means for inputting an instruction to let the reels 23 through 27 start spinning. The change button 19 is operation means for asking a shop keeper of money changing. The CASHOUT button 20 is operation means for inputting an instruction to prize coins equivalent to the amount of credits a player has earned (1 coin for 1 credit) onto a coin tray 30 through a coin prize opening 29 or for inputting an instruction to prize credits in a form of bar-code ticket 25 to be described later.

The 1-BET button 21 is operation means for accepting an instruction to wager 1 credit upon a game out of all the credits a player has held. The MAX-BET button 22 is operation means for accepting an instruction to wager maximum number of credits (5 credits is the maximum number in the first embodiment) a player can wager upon per one game out of all the credits the player has held. As to variant of BET-button, various BET buttons such as a 3-BET button, and the like are applicable.

In the slot machine 1 directed to the first embodiment, coins, bills, or electric valuable information (credit) corresponding to coins and bills can be used as gaming media. However, in the present invention, types of gaming media are not restricted to the above. For example, medals, tokens, electric money, tickets, and the like are applicable as gaming media.

Figure 3:
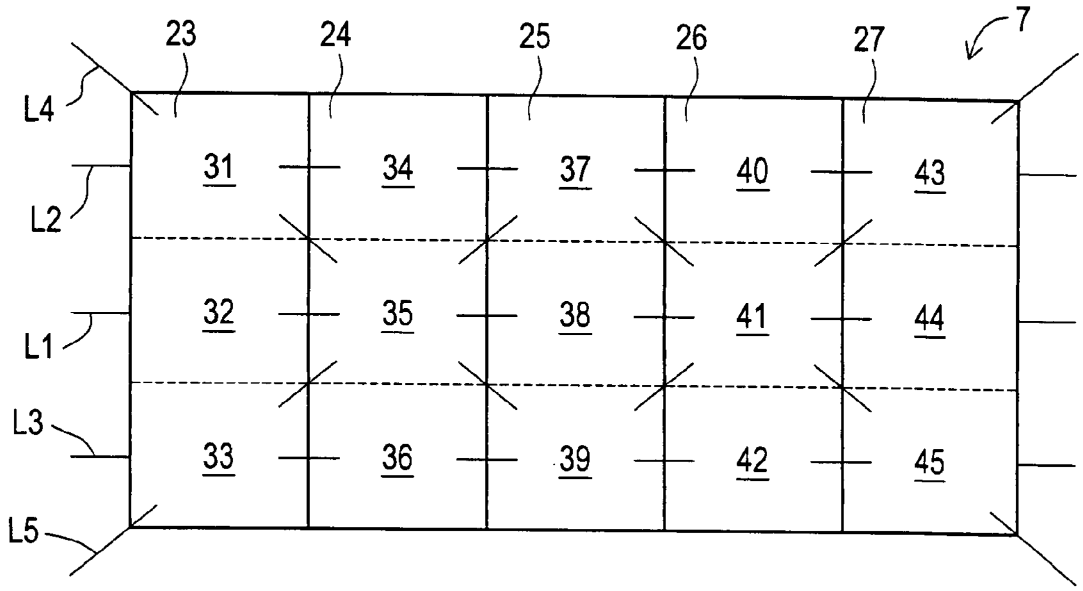
FIG. 3 is a front view showing a symbol display frame of the slot machine.
Figure 4:
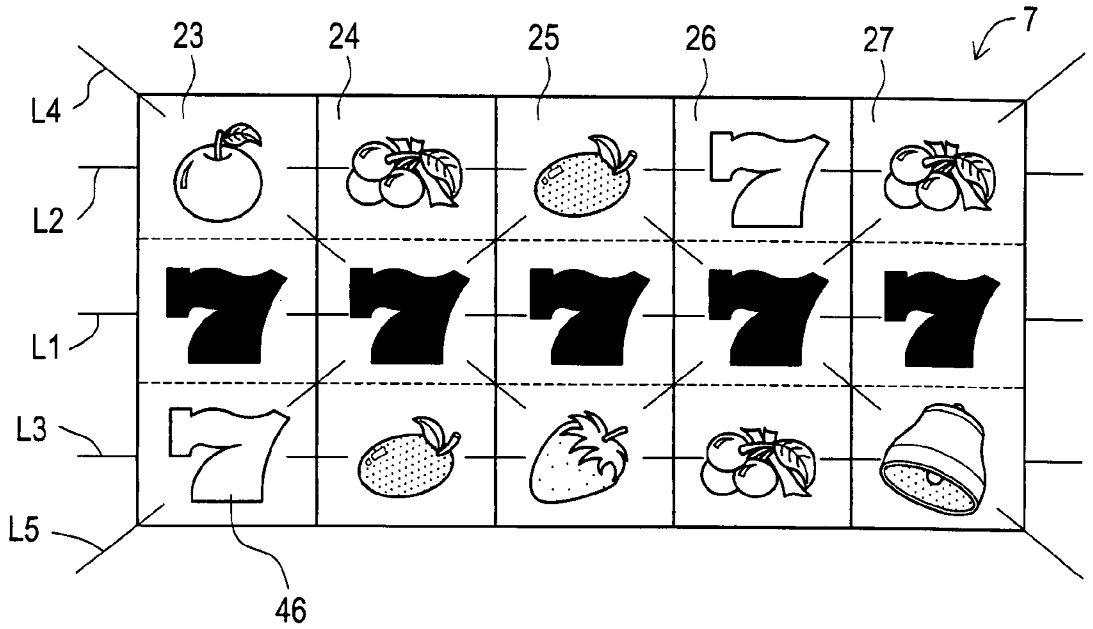
FIG. 4 is a front view showing the symbol display frame in which symbols are positioned.
Figure 5:
FIG. 5 is a prize table showing winning symbol combinations and prizes associated with the respective winging symbol combinations applied during a base game.
Figure 5:
Figure 5:
Figure 5:
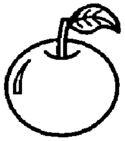
Figure 5:
Figure 5:
Figure 5:
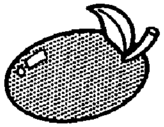

Next, there will be described symbols positioned in the symbol display frame 7 laid-out in the lower-side image display panel 6 in a game by referring to FIG. 3 through FIG. 5. FIG. 3 is a front view showing the symbol display frame 7 directed to the first embodiment. FIG. 4 is a front view showing the symbol display frame 7 in which symbols are repositioned. FIG. 5 is a prize table showing winning symbol combinations and prizes associated with the respective winging symbol combinations applied in the first embodiment.

As shown in FIG. 3, the symbol display frame 7 directed to the first embodiment consists of five columns for reels 23 through 27. The reels 23 through 27 individually have symbol display regions 31 through 45. More specifically, since the reels 23 through 27 individually display three symbols when they stop spinning, they have fifteen symbol display regions 31 through 45. Furthermore, there are defined five pay lines L1 through L5 which associate some or all of the symbol display regions 31 through 45 (five of them is associated as a group in the first embodiment) in accordance with a predetermined arrangement manner.

To start a game, the number of bets is determined by operating the 1-BET button 21 and the MAX-BET button 22, and next, the start button 18 is pressed. Upon an input of the start button 18, the reels 23 through 27 start spinning downward and spinning-state symbol columns depicted on respective reel bands are displayed within the symbol display regions 31 through 45 laid-out in the symbol display frame 7. After a lapse of a predetermined time, the reels 23 through 27 stop spinning and a part of each of the symbol columns depicted on reel bands of the reels 23 through 27 is displayed in each of the symbol display regions 31 through 45 laid-out in the symbol display frame 7. Thereby, a symbol is repositioned in the each of the symbol display regions 31 through 45 and fifteen symbols in total are repositioned there (see FIG. 4). Furthermore, various winning symbol combinations are previously defined (see FIG. 5) and in case a combination of symbols repositioned on one of activated pay lines L1, L2, L3, L4, and L5 laid-out in the symbol display frame 7 coincides with a winning symbol combination, a prize is awarded to a player.

It is to be noted that the symbol display regions 31 through 45 are plotted with dotted lines to make each of them discriminative in the drawings, however, the symbol display regions 31 through 45 may be plotted without such dotted lines.

Twenty-two symbols are depicted on respective reel bands of reels 23 through 27. Each symbol column is made by combining "RED7", "BLUE7", "BELL", "APPLE", "CHERRY", "STRAWBERRY", and "PLUM" shown in FIG. 5. The above mentioned symbols are positioned on respective reel bands of the reels 23 through 27 in individually different orders and combinations.

When three, four, or five identical symbols among "RED7", "BLUE7", "BELL", "APPLE", "CHERRY", "STRAWBERRY" and "PLUM are repositioned in succession on one of activated pay lines L1 through L5 within the symbol display frame 7, a previously defined prize is awarded to a player (see FIG. 5). It is to be noted that numerical values indicated in FIG. 5 are amount of prizes to be awarded per "1" bet. Therefore, in case the number of bets is "1", a numerical value indicated in FIG. 5 is added to player's credits, and in case the number of bets is "2" or larger, a multiple of the number of bets on the numerical value indicated in FIG. 5 is added to player's credits.

For example, in case three, four, or five "RED7" symbols are repositioned in succession on one of activated pay lines L1 through L5, a pre-defined amount of payouts, namely, 20~500 credit-equivalent prizes, is awarded to a player and a bonus game occurs. Games to be carried out by the slot machine 1 directed to the first embodiment consist of two game modes, namely, base game and bonus game. A base game is played in such a manner that a player aims to reposition a certain symbol combination on one of activated pay lines L1 through L5 within the symbol display frame 7 and five reels are used therein. On the other hand, a bonus game is played in such a manner that three jewelry boxes as choices are indicated in the lower-side image display panel 6, and then, a game directed to player's choice of a jewelry box associated with prize amount is carried out. Details of the bonus game will be omitted here.

In the first embodiment, in case a combination of symbols consisting of predetermined number of identical symbols is positioned on one of activated pay lines L1 thorough L5, the combination is treated as a winning symbol combination and a prize is awarded. However, other than the above case, a prize may be awarded in case a predetermined number of identical symbols are positioned in symbol display regions regardless of whether on a pay line or not.

Figure 6:
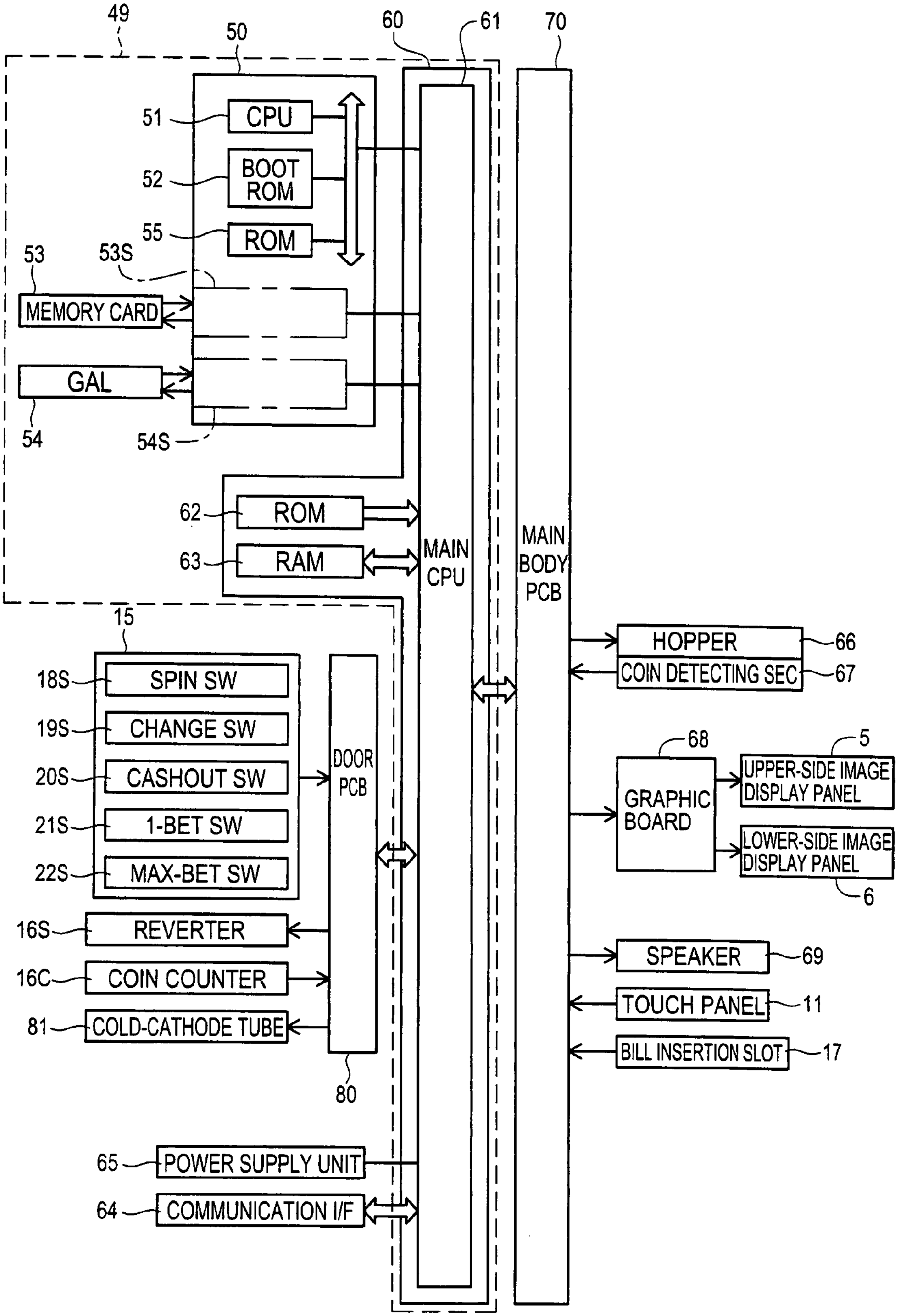
FIG. 6 is an exemplary block diagram showing a control system of the slot machine.

Next, there will be described a control system of the slot machine 1 directed to the first embodiment by referring to FIG. 6. FIG. 6 is a block diagram exemplary showing a control system of the slot machine 1.

As shown in FIG. 6, the control system of the slot machine 1 basically consists of a mother board 60 and a gaming board 50. The mother board 60 and the gaming board 50 makes up a controller 49 which is to execute a control program and the like (see FIGS. 7 and 8) to be described later.

The gaming board 50 comprises: a CPU 51, a ROM 55, a boot ROM 52, connected to one another by internal bus; a card slot 53S for accepting a memory card 53; and an IC socket 54S compatible with a GAL (Generic Array Logic) 54.

The memory card 53 is a non-volatile memory which is a recording medium to store a game program and a game system program (termed as game program and the like, hereafter) therein. The game program stored in the memory card 53 includes a lottery program. The lottery program is to decide a symbol 46 to be displayed in each of the symbol display regions 31 though 45.

The memory card 53 also includes a symbol lottery table for lotteries of symbols 46 to be displayed in the symbol display regions 31 through 45. The symbol lottery table is a table which associates a predetermined range of random number values with symbols 46 to be displayed in the symbol display regions 31 through 45. To be more specific, symbols 46 to be displayed in respective symbol display regions are firstly drawn and determined by referring to the symbol lottery table, and after that, it is detected whether or not a combination of symbols 46 determined by the lottery coincides with a winning symbol combination of which prize is awarded to a player.

As a variant, a symbol lottery table may be a table which associates a predetermined range of random number values with prize values to be awarded to a player. In such a case, a prize value to be awarded to a player is firstly drawn and determined by referring to the symbol lottery table, and after that, a winning combination of symbols 46 which satisfies the determined prize value is selected by the main CPU 61.

Next, there will be described the mother board 60. The mother board 60 is constituted by a commercially available and versatile mother board (printed-wiring board on which essential parts of a personal computer are mounted), and equipped with a main CPU 61, a ROM 62, a RAM 63, and a communication interface 64.

The ROM 62 consists of a memory device such as flash memory or the like, and stores permanent data of programs such as BIOS and the like which are to be executed by the main CPU 61. When the BIOS is executed by the main CPU 61, an initialization processing for certain peripheral devices is carried out and a fetch processing for fetching a game program and the like is started through the gaming board 50.

The RAM 63 stores data and programs to be used when the main CPU 61 starts processing. The RAM 63 can store various programs to be read out through the gaming board 50, namely, an authentication program, the game program and the like, as well as various information concerning amount of credits a player currently holds, and the like.

The communication interface 64 is a communicating device for communicating with a server or the like installed in a game arcade through a communication line.

A main body PCB 70 and a door PCB 80 both described later are separately connected to the mother board 60 with USB. Furthermore, a power supply unit 65 is connected to the mother board 60. When power is supplied to the mother board 60 from the power supply unit 65, the main CPU 61 in the mother board 60 is activated. At the same time, power is supplied to the gaming board 50 through PCI bus, whereby the CPU 51 is activated.

A hopper 66, a coin detecting section 67, a graphic board 68, a speaker 69, a touch panel 11, a bill validator 17 and the like are connected to the main body PCB 70.

The graphic board 68 controls image display at the upper-side image display panel 5 and the lower-side image display panel 6 in accordance with a control signal outputted from the main CPU 61. For example, the upper-side image display panel 5 displays a help screen and a prize table, and the lower-side image display panel 6 displays spinning-state symbols 46 and spinning-stopped-state symbols 46 in the symbol display frame 7 along virtual spinning of the reels 23 through 27 and also displays the volcano 28 as performance character and an animation effect of erupting volcano 28 with a predetermined timing.

A control panel 15, a reverter 16S, a coin counter 16C and a cold-cathode tube 81 are connected to the door PCB 80. The control panel 15 is equipped with: a start switch 18S directed to the start button 18; a change switch 19S directed to the change button 19; a CASHOUT switch 20S directed to the CASHOUT button 20; a 1-BET switch 21S directed to the 1-BET button 21; and a MAX-BET switch 22S directed to the MAX-BET button 22. Each of the switches 18S through 22S outputs a signal to the main CPU 61 when corresponding button is operated by a player.

Figure 7:
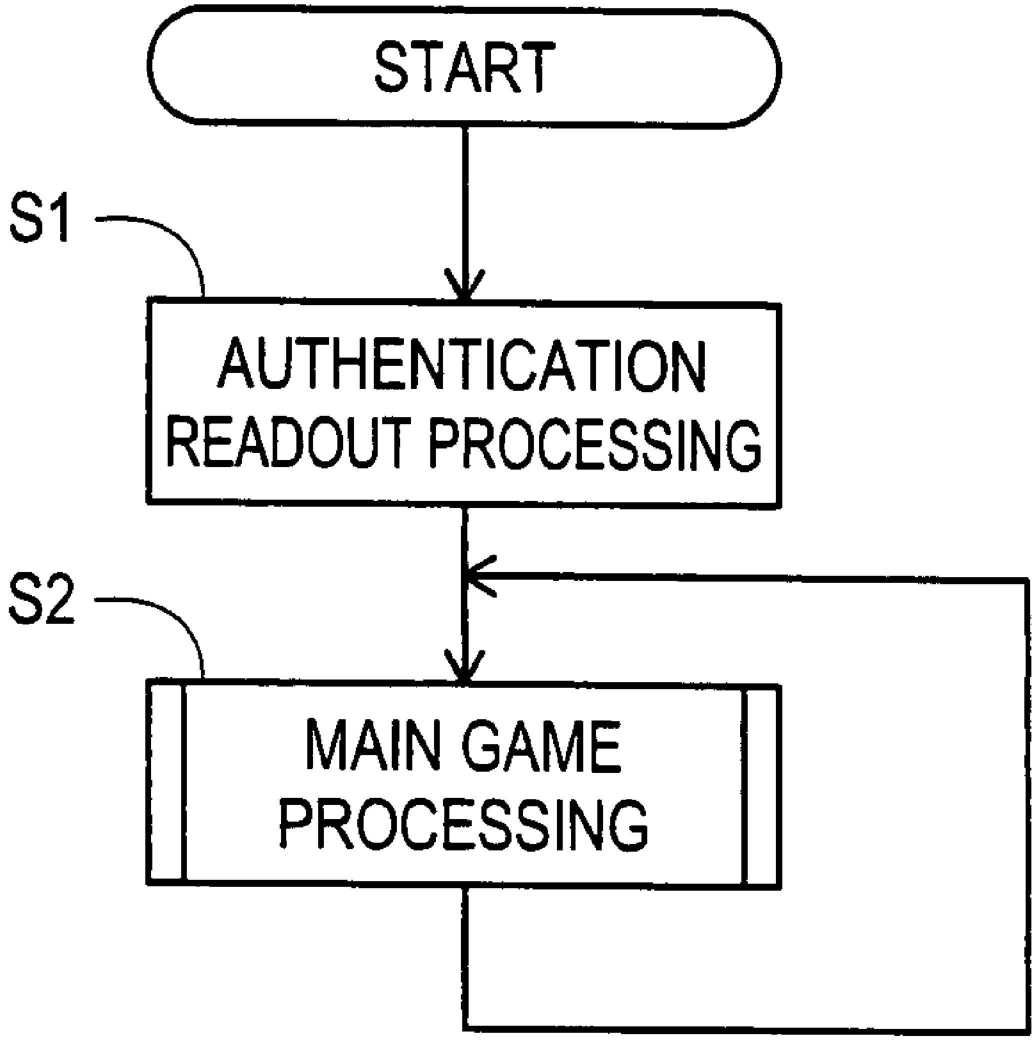
FIG. 7 is a flowchart of a main control program executed in the slot machine.

Next, there will be described a main control program to be executed in the slot machine 1 directed to the first embodiment by referring to drawings. FIG. 7 is a flowchart of a main control program.

It is to be noted that, before the main control program is executed, the memory card 53 has been inserted in the card slot 53S of the gaming board 50 and the GAL 54 has been attached to the IC socket 54S.

When power is turned on at the power supply unit 65, the mother board 60 and the gaming board 50 are respectively activated and an authentication readout processing is carried out at S1. At the authentication readout processing, the mother board 60 and the gaming board 50 carry out their respective processing procedures separately and simultaneously.

That is, in the gaming board 50, the CPU 51 reads out an auxiliary authentication program stored in the boot ROM 52 and carries out auxiliary authentication in accordance with the auxiliary authentication program to verify and prove that no falsification of the program is found before fetching the program to the mother board 60.

On the other hand, in the mother board 60, the main CPU 61 executes the BIOS stored in the ROM 62, and gets compressed data included in the BIOS decompressed into the RAM 63, thereby to execute the BIOS decompressed into the RAM 63 and to carry out diagnosis and initialization of various peripheral devices.

After that, the controller 49 reads out the authentication program stored in the ROM 55 and verifies and authenticates that the no falsification is found in the game program and the like stored in the memory card 53 inserted in the card slot 53S. After the authentication processing completes normally, the controller 49 writes the authenticated game program and the like in the RAM 63. Sequentially, the controller 49 carries out a fetch processing to read out prize rate setting data stored in the GAL 54 through the gaming board 50 and writes the read-out prize rate setting date in the RAM 63.

After completion of the above procedures, the controller 49 completes the authentication readout processing.

At S2, the main CPU 61 sequentially reads out and executes the game program and the like authenticated at the authentication readout processing of S1 thereby to carry out a main game processing. By carrying out the main game processing, a game is carried out with the slot machine 1 of the first embodiment. The main game processing is repeatedly carried out while power is supplied to the slot machine 1.

Next, there will be described a subroutine concerning the main game processing of S2 by referring to FIG. 8.

Figure 8:
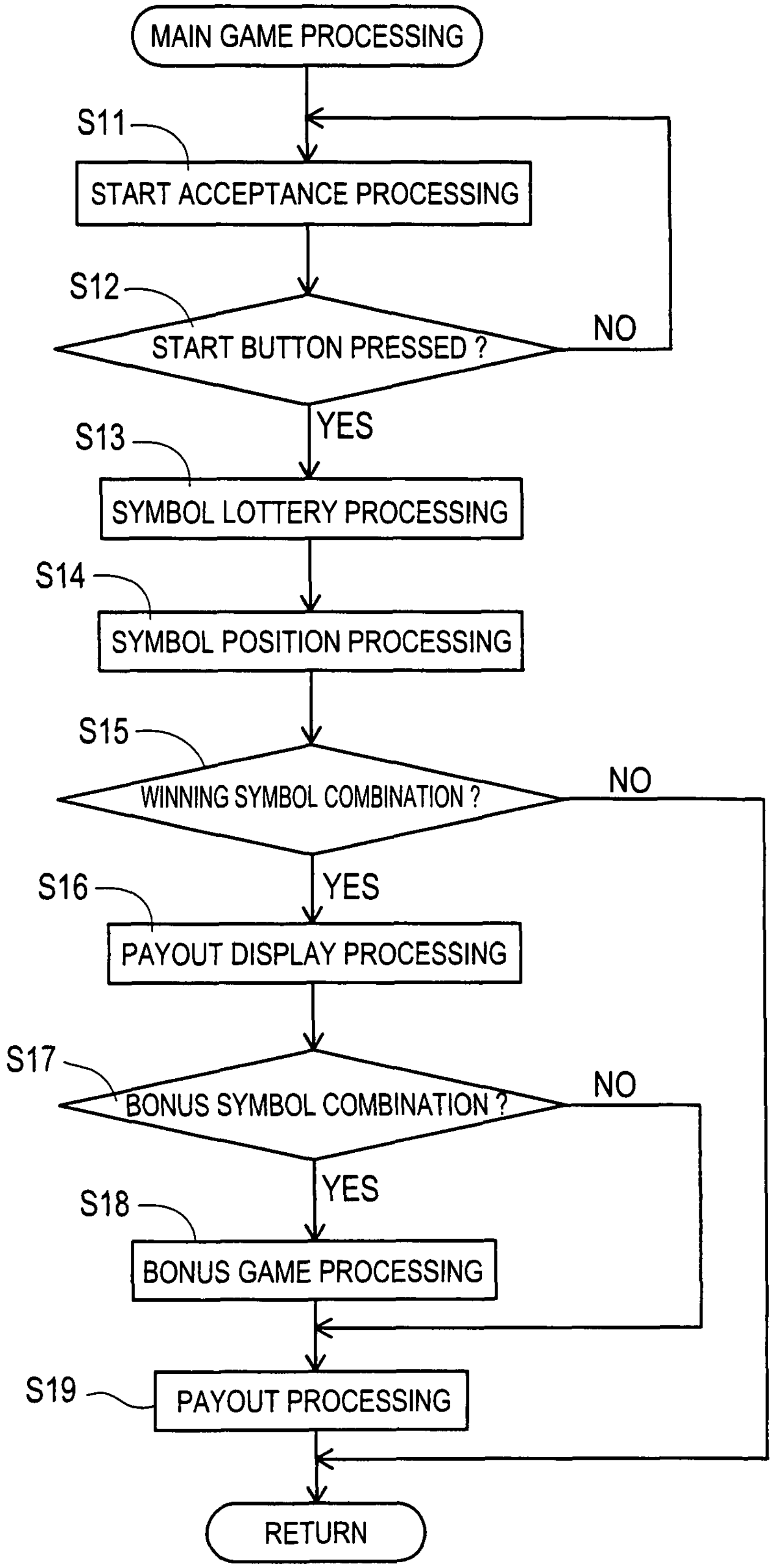
FIG. 8 is a flowchart of a main game processing program executed in the slot machine.

FIG. 8 shows the flowchart of the main game processing to be carried out in the slot machine 1 directed to the first embodiment. It is to be noted that programs indicated in the flowchart are stored in the memory card 53, decompressed in the RAM 63, and executed by the controller 49.

After carrying out a predetermined initial setting, the controller 49 firstly carries out a start acceptance processing at S11 in which an inserted coin is accepted and the number of bets is set. At the start acceptance processing, there is carried out a processing to clear out some data set and stored in a certain data regions (e.g., prize number counter, and the like). Furthermore, at the start acceptance processing, a player is allowed to carry out bet operations such as inserting coins and setting the number of bets for a next game between 1-BET and 5-BET with the 1-BET button 21 and the MAX-BET button 22.

In case of one bet, a pay line L1 is activated. In case of two bets, two pay lines L1 and L2 are activated. In case of three bets, three pay lines L1, L2, and L3 are activated. In case of four bets, four pay lines L1, L2, L3, and L4 are activated. In case of five bets (maximum bets), five pay lines L1, L2, L3, L4, and L5 are activated.

It is to be noted that, during the start acceptance processing, the symbol display frame 7 filled with fifteen symbols repositioned in a preceding game and the volcano 28, the performance character, (see FIG. 1) are displayed in the lower-side image display panel 6.

Next, the controller 49 judges whether or not the start button 18 has been pressed at S12. For judging presence or absence of an input from the start button 18, the controller 49 detects whether or not to receive an input signal outputted from the start switch 18S.

In case the start button 18 is not pressed (S12: NO), the processing returns to the start acceptance processing (S11) again. Under this state, a player can change the number of bets or the like by operating bet buttons. In case the start button 18 is pressed (S12: YES), the number of bets set for activating the pay lines L1, L2, L3, L4, and L5 by operating the 1-BET button 21 and the MAX-BET button 22 is subtracted from amount of credits the player currently holds, and stored in the RAM 43 as bet information.

At S13, the controller 49 carries out a symbol lottery processing in which there are drawn and determined symbols to be repositioned in respective symbol display regions 31 through 45 laid-out in the symbol display frame 7. To be more specific, the controller 49 executes a random number generating program included in the lottery program stored in the RAM 63. Thereby, random number values are extracted, and fifteen symbols 46 to be repositioned in the symbol display regions 31 through 45 (i.e., stop positions of the reels 23 through 27) are determined from plural kinds of symbols by referring to the extracted random number values and the symbol lottery table.

At S14, the controller 49 carries out a symbol position processing. At the symbol position processing, firstly, the controller 49 sends the graphic board 68 a start signal to start spinning of the reels 23 through 27. Upon receiving the start signal, the graphic board 68 carries out a spinning-reel-image display processing. That is, the graphic board 68 carries out display control to make the reels 23 through 27 start spinning virtually in the lower-side image display panel 6 so as to display symbol columns spinning at predetermined speed.

After sending the start signal, the controller 49 determines effects to be carried out in a game (e.g., an image to be displayed in the upper-side image display panel 5 and a sound to be outputted from the speaker 69) and starts carrying out effects in accordance with a determined manner. After a lapse of a predetermined time, a spinning-stopped-state reel image is sequentially displayed in order of reel 23→reel 24→reel 25→reel 26→reel 27, whereby three symbols 46 on each of the reels 23 through 27 are exposed and repositioned (see FIG. 4).

At S15, the controller 49 judges whether or not a combination of symbols 46 positioned on one of activated pay lines L1 through L5 within the symbol display regions coincides with a winning symbol combination to which a prize is awarded.

In case a combination of symbols 46 is judged as a winning symbol combination (S15: YES), the processing goes on to S16. In case it is judged as not a winning symbol combination (S15: NO), the main game processing is terminated. In case a new game is started continually to the preceding game, a series of processing to follow S11 is carried out.

At S16, the controller 49 notifies a player of contents of prizes by causing the lower-side image display panel 6 to indicate contents of prizes directed to the winning symbol combination detected at S15. For example, FIG. 4 indicates a winning symbol combination consisting of five "RED7" symbols positioned on the pay line L1. In such a case, a sign "Win 500" is indicated to notify that 500 credits will be awarded as prize.

Next, at S17, it is judged whether or not a combination of symbols 46 on one of activated pay lines within the symbol display regions 31 through 45 as a result of the symbol position processing at S14 coincides with a bonus symbol combination which causes a bonus game to occur as prize. Combinations of three or more of "RED7" symbols 46 positioned in succession on an activated pay line correspond to bonus symbol combinations, here.

In case it is judged that a combination of symbols 46 positioned on one of activated pay lines coincides with a bonus symbol combination (S17: YES), the processing goes on to a bonus game processing (S18). There can be considered various mannered bonus games, however, details of a bonus game will be described provided that a free game is the bonus game. A free game is a predetermined number of games equivalent to base games and carried out without any bets. To be more specific, at the bonus game processing of S18, a predetermined number of symbol repositioning are repeated by making the reels 23 through 27 spin and prize(s) of winning symbol combination(s) in the predetermined number of symbol repositioning is awarded to a player at a prize processing of S19 to be described later. A bonus game may be made to occur in case a predetermined number or more of specific identical symbols are positioned. A bonus game may be made to occur suddenly as mystery or various conditions can be set to make a bonus game occur. Furthermore, of a lottery table to be used in a free game, prizes of winning symbol combinations may be set higher than ones set in a lottery table to be used in a base game. In case it is judged that a combination of symbols 46 positioned on one of activated pay lines does not coincide with a bonus symbol combination (S17: NO), the processing goes on to S19.

At S19, the controller 49 awards a player a prize for a combination of indicated symbols. At this prize processing, a prize can be made with coins equivalent to amount of credits (1 credit per 1 coin) by pressing the CASHOUT button 20, or made with a bar-code ticket.

Figure 9:
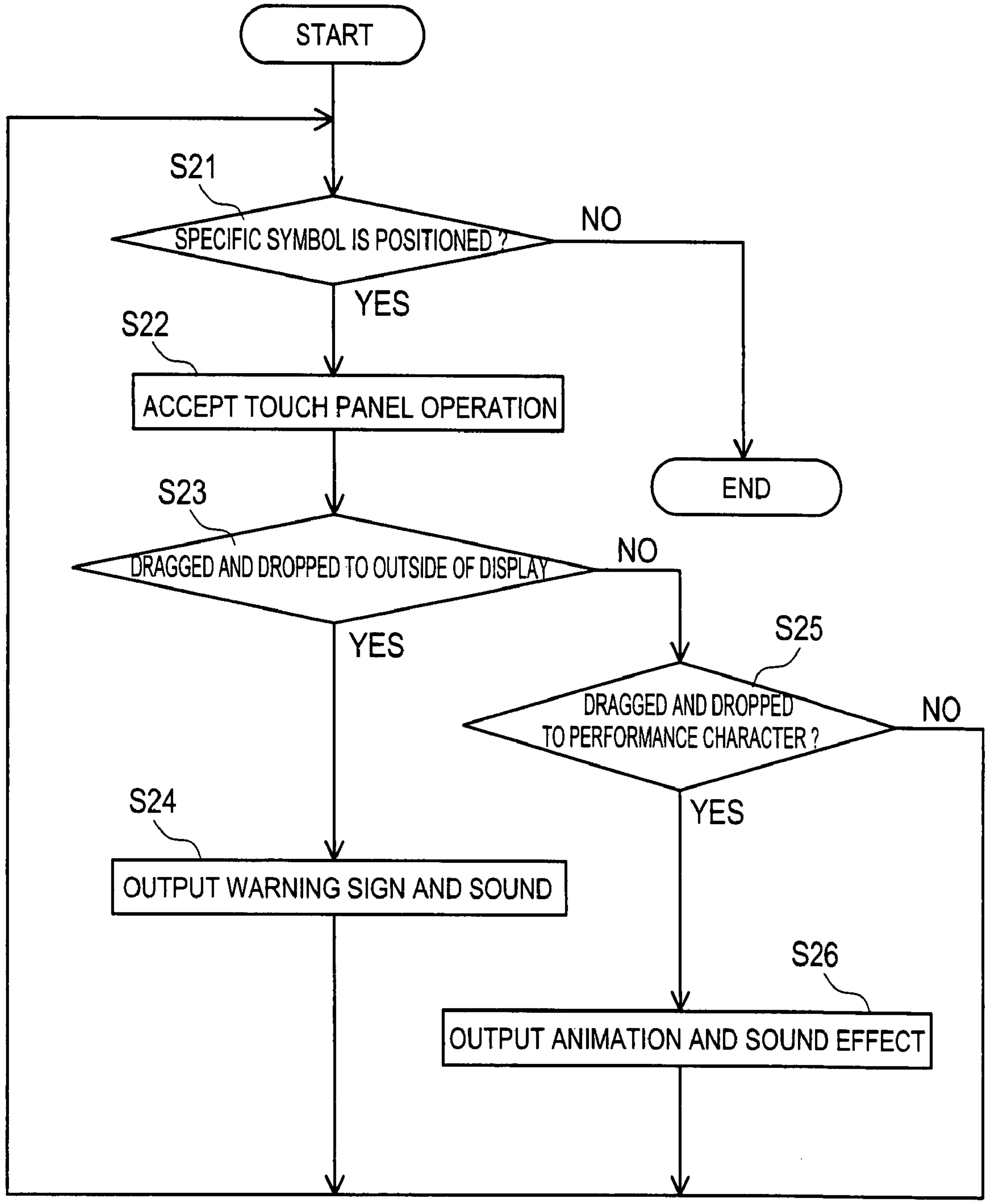
FIG. 9 is a flowchart of a character animation effect processing program executed in the slot machine.

Next, there will be described a character animation effect processing to be carried out in the slot machine 1 directed to the first embodiment by referring to FIG. 9. FIG. 9 is a flowchart showing a character animation effect processing program to be executed by the slot machine 1 directed to the first embodiment. It is to be noted that programs indicated in the flowchart of FIG. 9 are stored in the memory card 53, decompressed into the RAM 63, and repeatedly executed by the controller 49 with a predetermined length of interval (e.g., 200 ms).

Firstly, at S21, the controller 49 judges whether or not a "RED7" symbol or a "BLUE7" symbol is positioned in the symbol display frame 7 laid-out in the lower-side image display panel 6.

In case it is judged that neither a "RED7" symbol nor a "BLUE7" symbol is positioned (S21: NO), i.e., a case that symbols other than the above specific symbols are positioned in the symbol display frame 7 or a case that the reels 23 through 27 are in the middle of spinning, the character animation effect processing is terminated. In case either a "RED7" symbol or a "BLUE7" symbol is positioned (S21: YES), there will be accepted an operation with the touch panel 11 done by a player.

At S22, the controller 49 detects that a symbol 46 positioned in the symbol display frame 7 is designated by a player's touch operation. This detection is made in accordance with a location signal from the touch panel 11. For example, as shown at an upper stage in FIG. 1, in case a player touches a location of a "RED7" symbol at a second row from top and at a third column from left, the controller 49 detects that the "RED7" symbol at the second row from top and at the third column from left is designated by the player.

At S22, the controller 49 also detects that a player keeps touching and moving (dragging) a symbol 46 positioned in the symbol display frame 7. In case the controller 49 detects that a symbol is being dragged, display control is carried and in the lower-side image display panel 6, the symbol is displayed as if moving together with movement of a finger which touches the symbol, as shown at a middle stage of FIG. 1. It is to be noted that it is only a "RED7" symbol that can be dragged and moved in the first embodiment.

Further on, at S22, the controller 49 detects that the finger leaves (drops) the being-dragged symbol 46. Especially, in case the controller 49 detects that a "RED7" symbol or a "BLUE7" symbol is dropped to the crater of the volcano 28, the performance character, an animation effect of erupting volcano 28 is outputted in the lower-side image display panel, as shown at a lower stage of FIG. 1. In addition, a sound effect corresponding to a volcanic eruption sound of the volcano 28 is outputted from the speaker 69.

Next, at S23, the controller 49 judges whether or not a "RED7" symbol 46 or a "BLUE7" symbol 46 is dragged and dropped to the outside of the display, i.e., the outside of the lower-side image display panel 6. In case it is judged that a "RED7" symbol 46 or a "BLUE7" symbol 46 is dragged and dropped to the outside of display (S23: YES), a sign "WARNIG !" is indicated in the lower-side image display panel 6 (S24). Furthermore, a warning sound which is an electronic sound is outputted from the speaker 69. After that, the processing returns on to the judgment process of S21.

On the other hand, in case it is judged that a "RED7" symbol 46 or a "BLUE7" symbol 46 is not dragged and dropped to the outside of the display (S23: NO), the processing goes on to S25 and it is judged whether or not a "RED7" symbol 46 or a "BLUE7" symbol 46 is dragged and dropped to the crater of the volcano 28 which is the performance character indicated in the lower-side image display panel 6.

In case it is judged that a "RED7" symbol 46 or a "BLUE7" symbol 46 is dragged and dropped to the crater of the volcano 28 (S25: YES), there is outputted an animation effect of erupting volcano 28 to the lower-side image panel 6 (S26). There is also outputted a sound effect corresponding to a volcanic eruption sound of the volcano 28 from the speaker 69 (S26).

It is to be noted that, in the first embodiment, an animation effect and a sound effect outputted when a "RED7" symbol 46 is dragged and dropped to the crater of the volcano 28 differs from the one outputted when a "BLUE7" symbol 46 is dragged and dropped to the crater of the volcano 28. To be more specific, the animation effect and sound effect outputted when a "BLUE7" symbol 46 is dragged and dropped is more drastic than the ones outputted when a "RED7" symbol 46 is dragged and dropped.

On the other hand, in case it is judged that a "RED7" symbol 46 or a "BLUE7" symbol 46 is not dragged and dropped to the crater of the volcano 28 (S25: NO), the processing returns to S21 and it is judged whether or not a specific symbol is positioned in the symbol display frame 7 laid-out in the lower-side image display panel 6.

As described, in the slot machine 1 directed to the first embodiment, for starting a game, a player operates the 1-BET button 21 and the MAX-BET button 22, whereby the number of bets, between 1-BET and 5-BET, for a next game is accepted (S11). Consequently, the reels 23 through 27 start spinning and, after a lapse of a predetermined time, fifteen symbols 46 are repositioned in the symbol display regions (S14). Particularly, in case a "RED7" symbol 46 or a "BLUE7" symbol 46 is included in the repositioned symbols, a player is allowed to drag and drop the "RED7" or "BLUE7" symbol 46 to the crater of the volcano 28, the performance character. As a result, there are outputted an animation effect of erupting volcano 28 and a sound effect corresponding to an eruption sound (S26). Thereby, new entertaining factors which conventional slot machines did not have inherently can be achieved. Furthermore, since a player can enjoy various performances by moving a positioned symbol during a waiting time in a game, the player does not get bored.

Furthermore, in case a symbol is dragged and dropped to the outside of a display, a warning sign is displayed and a warning sound is outputted (S24). Therefore, a player can carry out such special operation correctly with the aid of the warning sign and sound.

Second Embodiment

Next, there will be described a slot machine directed to a second embodiment by referring to FIG. 10 through FIG. 13. It is to be noted that, in the following descriptions, numerals same as those of the slot machine 1 directed to the first embodiment depicted in FIG. 1 through FIG. 9 are assigned to similar or same structural portions of the slot machine directed to the second embodiment.

An outline construction of the slot machine directed to the second embodiment is almost same as that of the slot machine 1 directed to the first embodiment. Also, various control processing are almost same as those of the slot machine 1 directed to the first embodiment.

The slot machine 1 directed to the first embodiment outputs an animation effect and a sound effect when a symbol positioned in the symbol display frame 7 is dragged and dropped to the performance character, whereas the slot machine directed to the second embodiment outputs an animation effect and a sound effect when a symbol whose look is same as or similar to a symbol to be positioned in a predetermined location in the symbol display frame 7 is dragged and dropped to the performance character. In this regard, the slot machine directed to the second embodiment differs from the slot machine 1 directed to the first embodiment.

Figure 10:
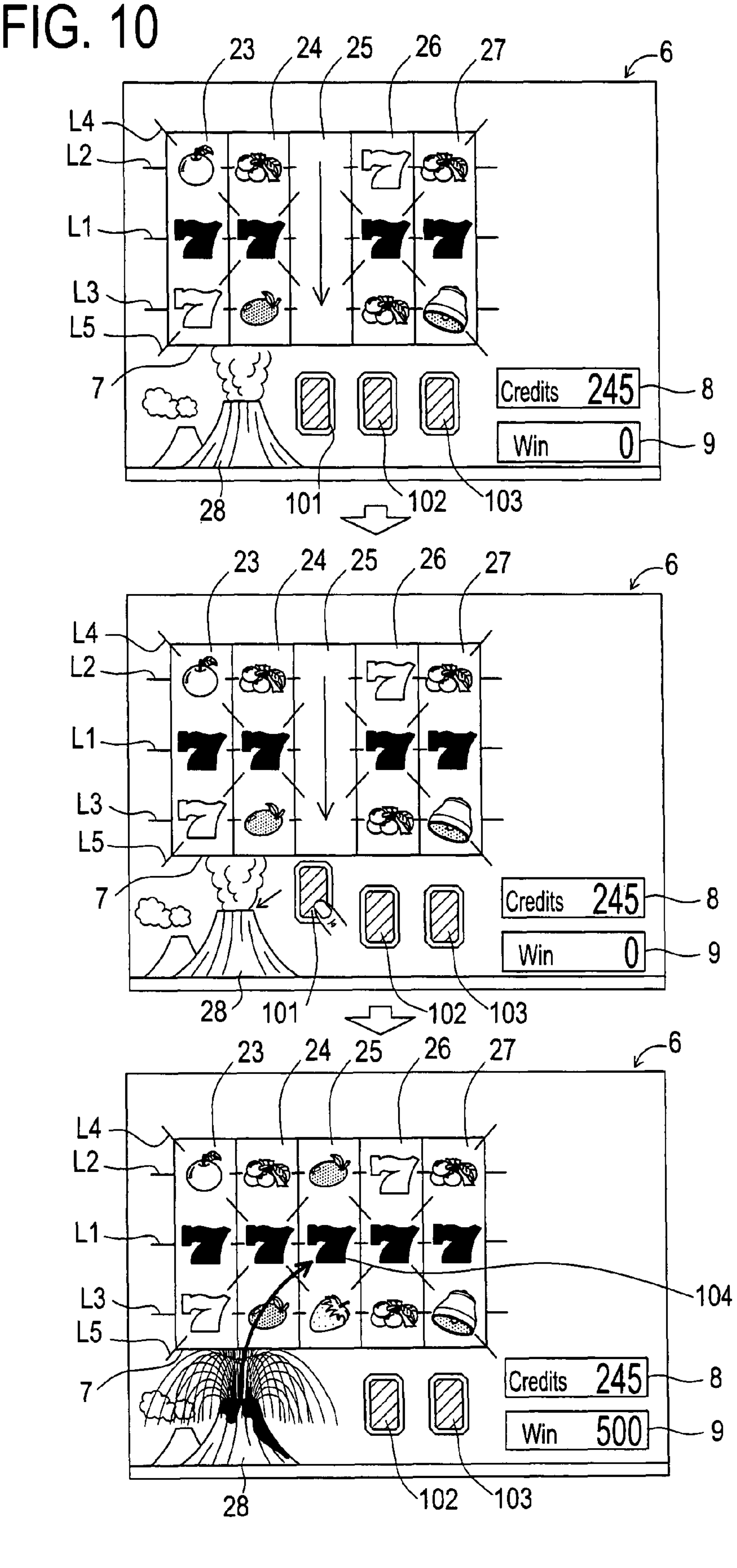
FIG. 10 is a diagram for illustrating a feature of typical game developments directed to a second embodiment that may be encountered in accordance with the principles of the present invention.
Figure 11:
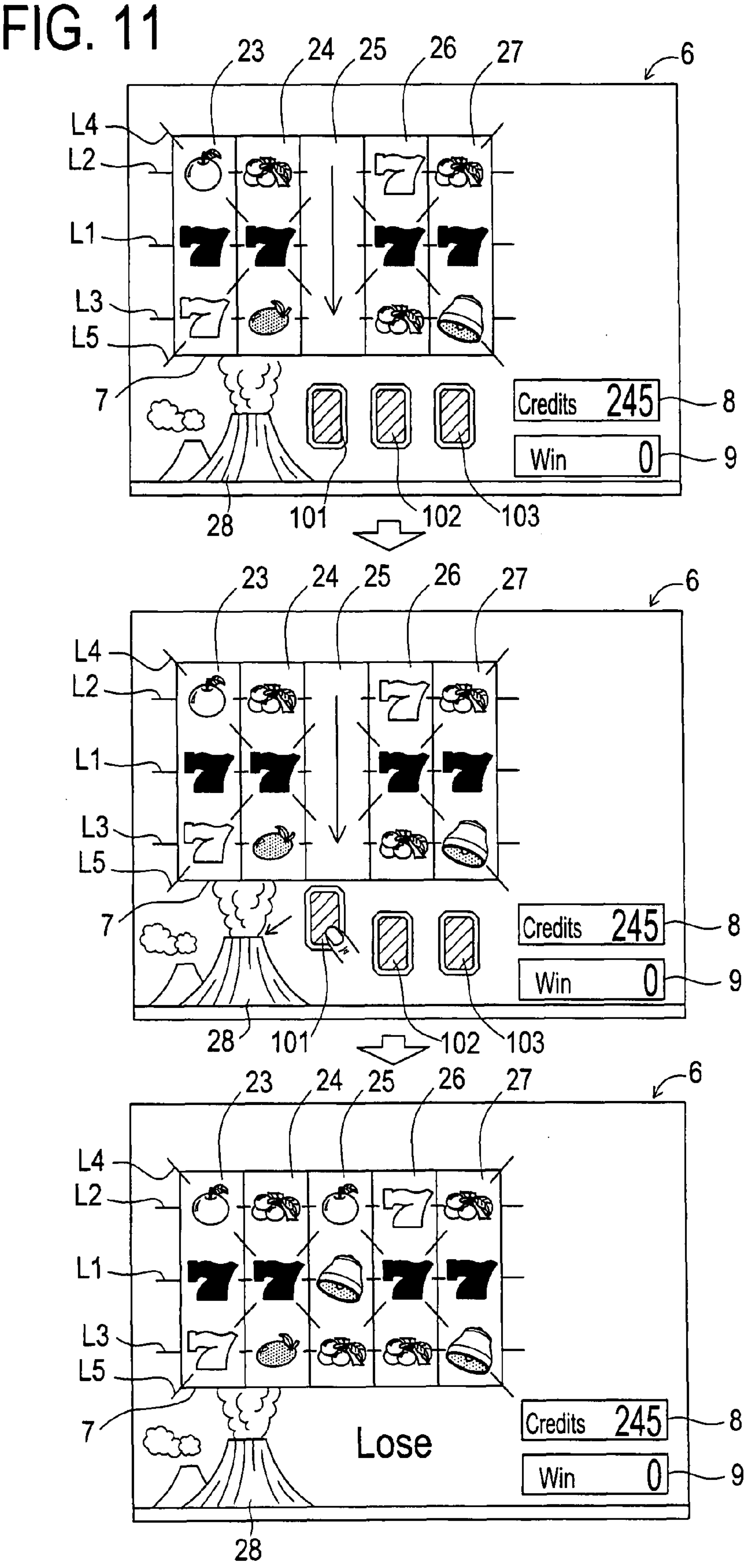
FIG. 11 is another diagram for illustrating a feature of typical game developments directed to the second embodiment that may be encountered in accordance with the principles of the present invention.

There will be described a feature of the slot machine directed to the second embodiment by referring to FIG. 10 and FIG. 11. FIG. 10 and FIG. 11 are diagrams for illustrating a feature of typical game developments directed to the second embodiment that may be encountered in accordance with the principles of the present invention. In the slot machine directed to the second embodiment, as shown in FIG. 10, the lower-side image display panel 6 displays: the symbol display frame 7 in which fifteen symbols are positioned in a form of 3 rows×5 columns matrix; and the volcano 28 which is a performance character. In this regard, in the symbol display frame 7, there are arranged five columns of symbol display regions each of which is to position three of many symbols depicted on a reel band of a reel. That is, three symbol display regions are assigned to each of five reels 23 through 27. In each of the symbol display regions, one of symbols depicted on respective reel bands of the reels 23 through 27 is positioned. Furthermore, five pay lines L1, L2, L3, L4, and L5 are provided on the symbol display frame 7 laid-out in the lower-side image display panel 6. Furthermore, various winning symbol combinations are previously defined.

In every base game carried out by the slot machine directed to the second embodiment, the start button is operated by a player, whereby some or all of the five pay lines L1, L2, L3, L4, and L5 is/are activated depending on the number of bets. Especially, in case either a winning symbol combination or a one-symbol-different losing symbol combination in which only one of the symbols does not coincide with a certain winning symbol combination is to be positioned on one of activated pay lines L1 through L5, symbols are repositioned in the symbol display frame 7 while spinning state is kept at predetermined locations to put a certain incomplete symbol combination on an activated pay line in a ready-to-win situation (in FIG. 10, three symbols to be positioned with the reel 25 are left undetermined). After that, there will be displayed three cards (symbol characters) 101 through 103 with their symbol-character faces placed downward in the lower-side image display panel 6. That is, predetermined symbols (e.g., "RED7", "CHERRY", and "PLUM") are depicted on downward faces of the cards 101 through 103 and the depicted symbols are made indistinguishable since they are placed with their symbol-character faces downward. After that, in case a player drags and drops a card whose symbol character on its downward face completes a winning symbol combination to the crater of the volcano 28, an animation effect to represent a volcanic eruption of the volcano 28 and a sound effect corresponding to a volcanic eruption sound of the volcano 28 are outputted. At the same time, a card which is now turned over to make its symbol distinguishable is moved from the crater of the volcano 28 to a ready-to-win-situated symbol display region in which a symbol has not been repositioned yet, and further on, the still-spinning-state reel is stopped to position symbols in other symbol-undetermined symbol display regions which are not put in the ready-to-win situation. At this opportunity, in the symbol display region to which the turned-over card has been moved, a winning symbol 104 which completes a winning symbol combination is repositioned. In case the cards 101 through 103 are dragged and dropped to the outside of the display, a warning sign and a warning sound are outputted.

On the other hand, in case none of the three cards 101 through 103 is a card whose symbol character on its downward face completes a winning symbol combination, spinning of the reel 25 is stopped to position three symbols in the three symbol-undetermined symbol display regions when all of the cards 101 through 103 are dragged and dropped to the crater of the volcano 28, as shown in FIG. 11. In this case, three symbols to be newly positioned are positioned in a manner not to make up a winning symbol combination.

Figure 12:
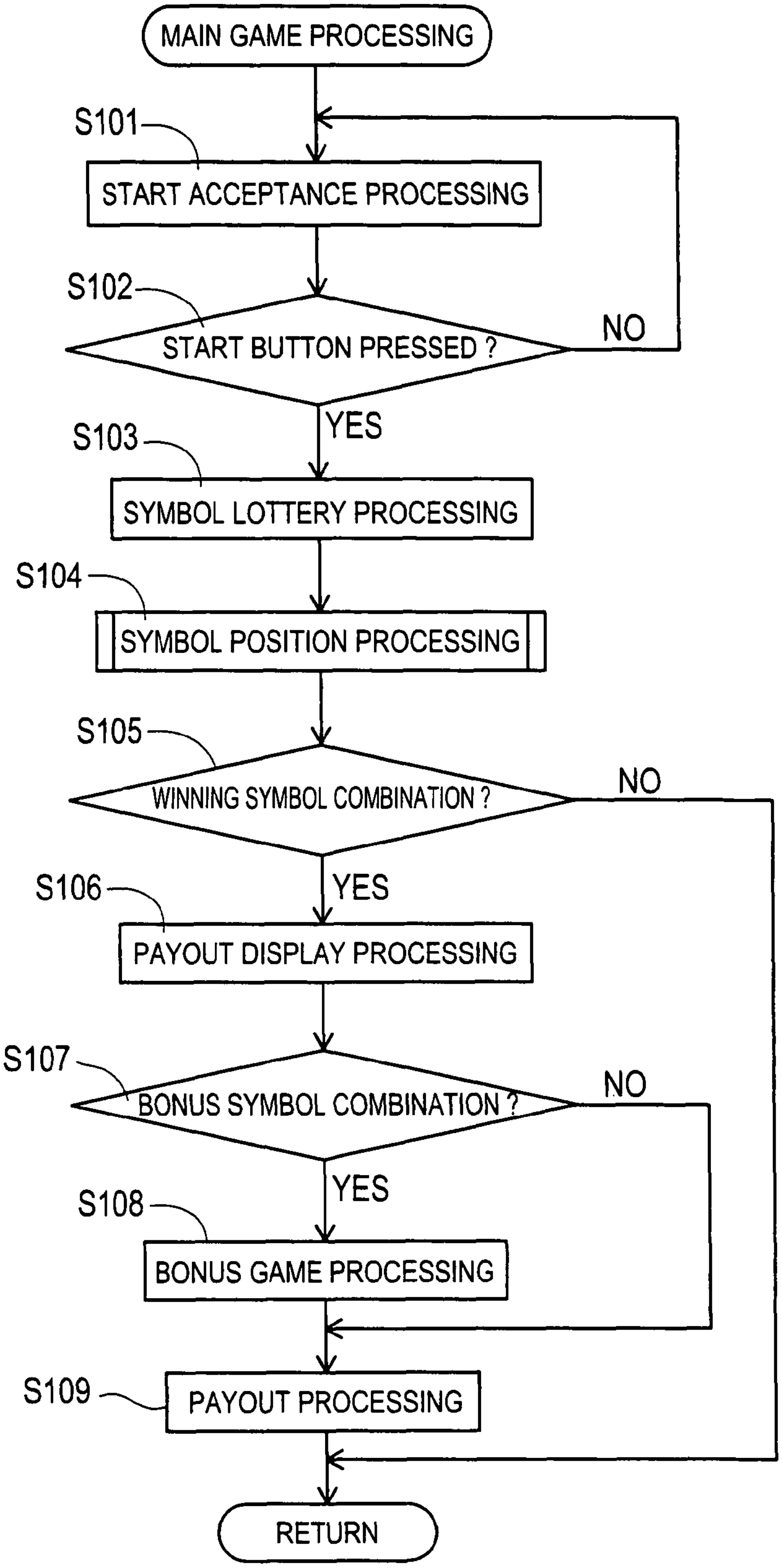
FIG. 12 is a flowchart of a main game processing program executed in the slot machine directed to the second embodiment.

Next, there will be described a subroutine concerning a main game processing to be carried out by the slot machine directed to the second embodiment by referring to FIG. 12. FIG. 12 shows a flowchart of a main game processing program to be executed in the slot machine directed to the second embodiment. It is to be noted that programs indicated in the flowchart are stored in the memory card 53, decompressed in the RAM 63, and executed by the controller 49.

Since S101, S102 and S103 correspond to already-described S11, S12, and S13, respectively, directed to the main game processing (FIG. 8) to be carried out in the slot machine 1 directed the first embodiment, descriptions of them will be omitted.

Figure 13:
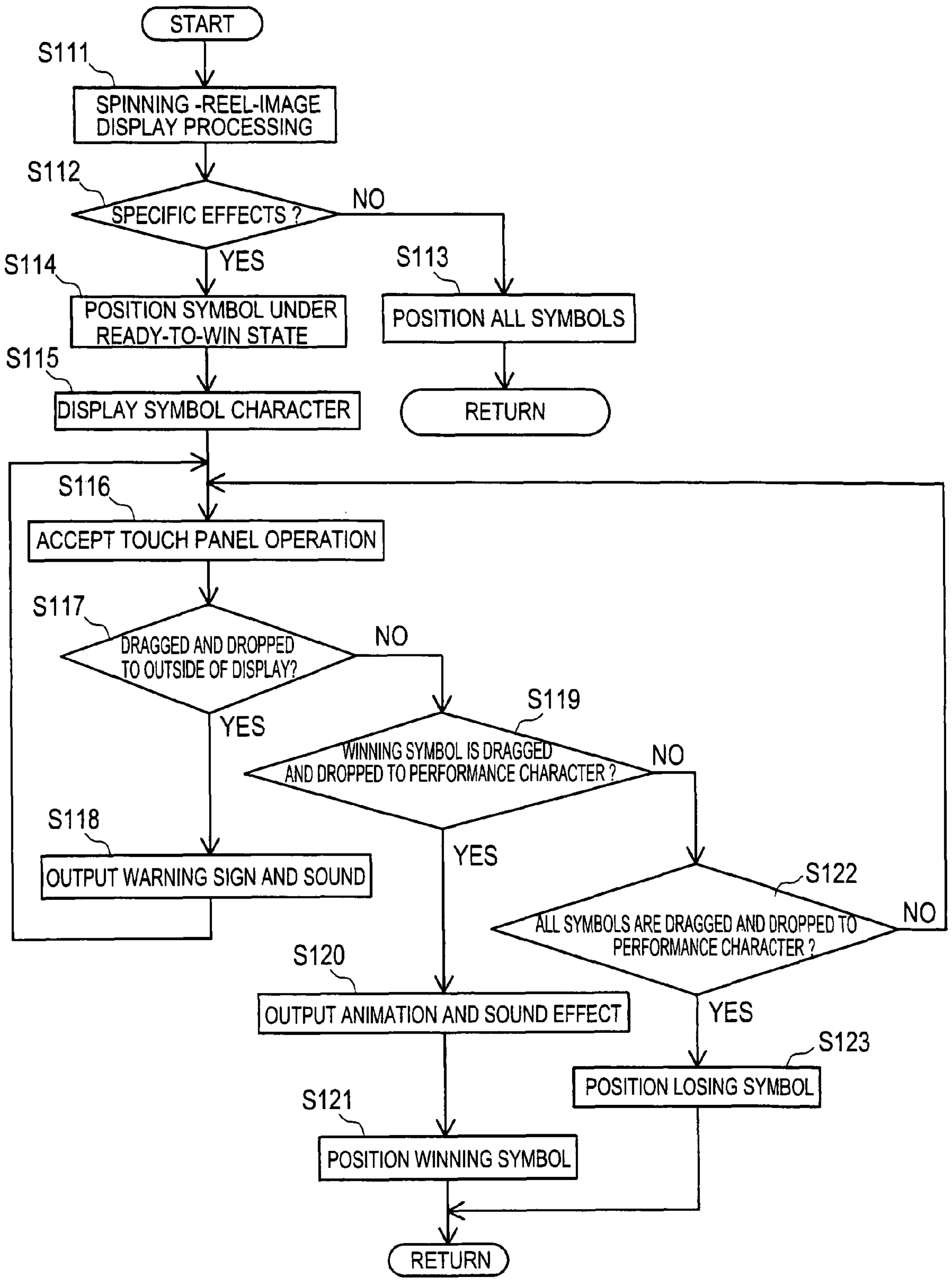
FIG. 13 is a flowchart of a symbol positioning processing program in the slot machine directed to the second embodiment.

At S104, the controller 49 carries out a symbol position processing to be described later (FIG. 13). At the symbol position processing, symbols excluding specific symbols ("PLUM", "RED7", and "STRAWBERRY" in FIG. 10) to be positioned in predetermined locations (corresponding to symbol display regions 37 through 39 in FIG. 10) are firstly positioned. After that, symbol characters (cards 101 through 103) whose looks are same as or similar to a certain symbol are indicated with their symbols indistinguishable. After the thus displayed symbol characters are dragged and dropped to the performance character (the volcano 28), a specific symbol is repositioned in accordance with a lottery result (see FIG. 10 and FIG. 11).

Since S105, S106, S107, S108 and S109 correspond to already-described S15, S16, S17, S18 and S19, respectively, directed to the main game processing (FIG. 8) to be carried out in the slot machine 1 directed the first embodiment, descriptions of them will be omitted.

Next, there will be described a subroutine concerning a symbol position processing to be carried out by the slot machine directed to the second embodiment by referring to FIG. 13. FIG. 13 shows a flowchart of a symbol position processing program to be executed in the slot machine directed to the second embodiment. It is to be noted that programs indicated in the flowchart are stored in the memory card 53, decompressed in the RAM 63, and executed by the controller 49.

Firstly, at S111, the controller 49 sends the graphic board 68 a start signal to start spinning of the reels 23 through 27. Upon receiving the start signal, the graphic board 68 carries out a spinning-reel-image display processing. That is, the graphic board 68 carries out display control to make the reels 23 through 27 start spinning virtually in the lower-side image display panel 6 so as to display symbol columns spinning at predetermined speed. After sending the start signal, the controller 49 determines effects to be carried out in a game (e.g., an image to be displayed in the upper-side image display panel 5 and a sound to be outputted from the speaker 69) and starts carrying out effects in accordance with the determined manner.

Next, at S112, as a lottery result at S103, it is judged whether or not either one of the following two conditions is satisfied: (1) a winning symbol combination is positioned on one of activated pay lines L1 through L5; or (2) a one-symbol-different losing combination in which only one of the symbols does not coincide with a certain winning symbol combination is positioned on one of activated pay lines L1 through L5 and a manner to use the cards 101 through 103 is selected as effects for the performance.

In case the manner to use the cards 101 through 103 is not selected (S112: NO), after a lapse of a predetermined time, a spinning-stopped-state reel image is sequentially displayed by the controller 49 in order of reel 23→reel 24→reel 25→reel 26→reel 27, whereby three symbols 46 are exposed and repositioned in each of the reels 23 through 27 (S113). After that, the processing goes on to a judgment processing at S105.

In case the manner to use the cards 101 through 103 is selected (S112: YES), after a lapse of a predetermined time, a spinning-stopped-state reel image is sequentially displayed by the controller 49 at four of the reels 23 through 27 so as to represent a ready-to-win situation. Thereby, three symbols 46 are repositioned in each of the four spinning-stopped-state reels among the reels 23 through 27 (S114).

After that, at S115, the controller 49 displays three symbol-characters (cards 101 through 103) with their predetermined symbol-character faces (e.g., "RED7", "CHERRY", and "PLUM") placed downward to make them indistinguishable in the lower-side image display panel 6. It is to be noted that one of the three symbol characters is the symbol to be indicated in a symbol-undetermined symbol display region put in the ready-to-win situation, which is determined in accordance with a lottery result at S103.

After that, at S116, the controller 49 accepts an operation done by a player with the touch panel 11. The controller 49 detects that one of the cards 101 through 103 positioned within the symbol display frame 7 is designated by a player's touch operation. This detection is made in accordance with a location signal from the touch panel 11. For example, as shown at a middle stage in FIG. 10, in case a player touches a location of the left-most card 101, the controller 49 detects that the card 101 is designated by the player.

At S116, the controller 49 also detects that a player keeps touching and moving (dragging) one of the cards 101 through 103 indicated in the lower-side image display panel 6. In case the controller 49 detects that a one of the cards 101 through 103 is being dragged, display control is carried out and in the lower-side image display panel 6, the designated card is displayed as if moving together with movement of a finger which touches the card, as shown at a middle stage of FIG. 10.

Further on, at S116, the controller 49 detects that the finger leaves (drops) the being-dragged card. Especially, in case the controller 49 detects that a card whose symbol at its downward face is a symbol to complete a winning symbol combination which is currently a ready-to-win-situated symbol combination is dropped to the crater of the volcano 28, the performance character, an animation effect of erupting volcano 28 to outputted at the lower-side image display panel 6, as shown at a lower stage of FIG. 10. In addition, a sound effect corresponding to a volcanic eruption sound of the volcano 28 is outputted from the speaker 69.

Next, at S117, the controller 49 judges whether or not one of the cards 101 through 103 is dragged and dropped to the outside of the display, i.e., the outside of the lower-side image display panel 6. In case it is judged that the card is dragged and dropped to outside of display (S117: YES), a sign, "WARNIG !", is indicated in the lower-side image display panel 6 (S118). Furthermore, a warning sound which is an electronic sound is outputted from the speaker 69. After that, the processing goes on to a processing at S116.

On the other hand, in case it is judged that one of the cared 101 through 103 is not dragged and dropped to the outside of the display (S117: NO), the processing goes on to S119 and it is judged whether or not a card of a winning symbol at its downward face is dragged and dropped to the crater of the volcano 28 which is the performance character.

In case it is judged that the card of the winning symbol at its downward face is dragged and dropped to the crater of the volcano 28 (S119: YES), there is outputted an animation effect of erupting volcano 28 to the lower-side image panel 6 (S120). There is also outputted a sound effect corresponding to a volcanic eruption sound of the volcano 28 from the speaker 69 (S120). At the same time, one of the cards which is now turned over to make its symbol distinguishable is moved to a symbol-undetermined symbol display region put in ready-to-win situation, and in accordance with the lottery result at S103, symbols are positioned in other symbol-undetermined symbol display regions not put in the ready-to-win situation. In this case, a winning symbol 104 to make up a winning symbol combination is positioned in the symbol display region where the turned-over card is moved (S121).

It is to be noted that an animation effect and a sound effect outputted when a winning symbol is dragged and dropped to the crater of the volcano 28 differs depending on winning symbol combination (i.e., prize value to be awarded). To be more specific, the animation effect and the sound effect outputted when a winning symbol combination consisting of three or more of "RED7" symbols 46 is positioned on an activated pay line is more drastic than the ones outputted when a winning symbol combination consisting of three or more of "CHERRY" symbols 46 is positioned on an activated pay line. Other than the above case, as to-be-awarded prize value of a winning symbol combination is higher, an animation effect and a sound effect to be outputted may be made more drastic.

In case it is judged that a card of the winning symbol at its downward face is not dragged and dropped to the crater of the volcano 28 (S119: NO), it is further judged whether or not all of the three cards 101 through 103 are dragged and dropped to the crater of the volcano 28 (S122). In case it is judged that all of the three cards 101 through 103 are dragged and dropped to the crater of the volcano 28 (S122: YES), symbols are positioned in other symbol-undetermined symbol display regions not put in the ready-to-win situation in accordance with the lottery result at S103 (S123). In this case, a non-winning symbol is positioned in a symbol-undetermined symbol display region put in the ready-to-win situation and therefore, a winning symbol combination is not completed (see FIG. 11).

In case it is judged that all of the three cards 101 through 103 are not dragged and dropped to the crater of the volcano 28 (S122: NO), the processing returns to S116.

As described, in the slot machine directed to the second embodiment, for starting a game, a player operates the 1-BET button 21 and the MAX-BET button 22, whereby the number of bets, between 1-BET and 5-BET, for a next game is accepted (S101). Consequently, the reels 23 through 27 start spinning. In case a manner to use the cards 101 through 103 is selected as effects, except symbols to be positioned in predetermined symbol display regions, symbols are repositioned after a lapse of a predetermined time (S114). After that, there are displayed plural symbol characters whose looks are same as or similar to certain symbols with their symbol-character faces placed downward (S115). Particularly, in case a symbol character of a winning symbol at its downward face is dragged and dropped to the crater of the volcano 28 which is the performance character, there are outputted an animation effect of erupting volcano 28 and a sound effect corresponding to an eruption sound (S120) and further on, the winning symbol is positioned in the symbol display region left undetermined in the ready-to-win-situated symbol combination to complete a winning symbol combination (S121). Thereby, new entertaining factors which conventional slot machines did not have inherently can be achieved. Furthermore, the controller 49 makes a player's operations intervene in a series of symbol-positioning control, which prevents a game from getting monotonous. Furthermore, symbol-positioning control with this manner makes it possible to make the player feel as if a winning symbol combination is completed as a result of player's operations Furthermore, in case the cards 101 through 103 are dragged and dropped to the outside of a display, a warning sign is displayed and a warning sound is outputted (S118). Therefore, a player can carry out such special operation correctly with the aid of the warning sign and sound.

Third Embodiment

Figure 14:
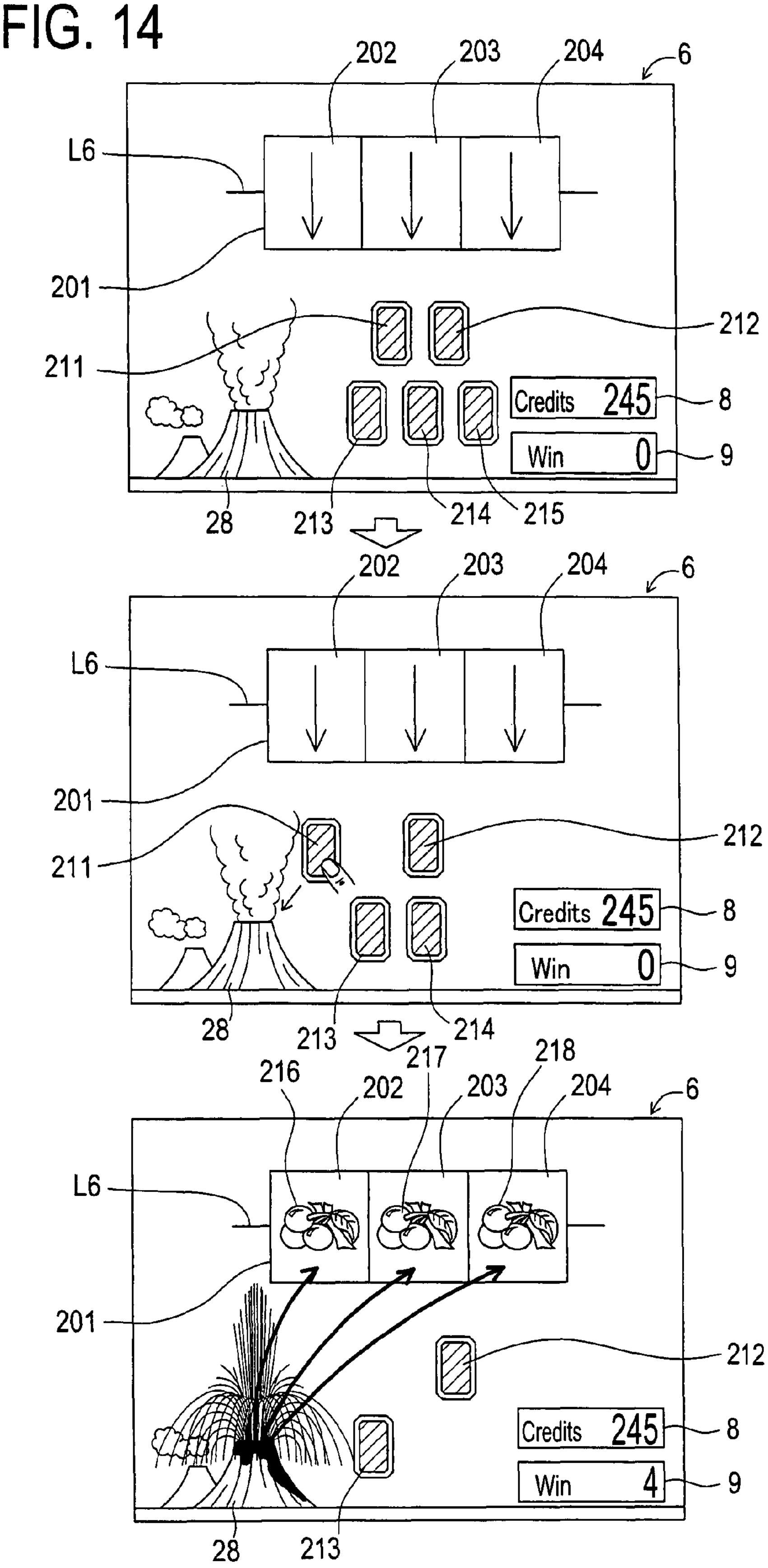
FIG. 14 is a diagram for illustrating a feature of typical game developments directed to a third embodiment that may be encountered in accordance with the principles of the present invention.
Figure 15:
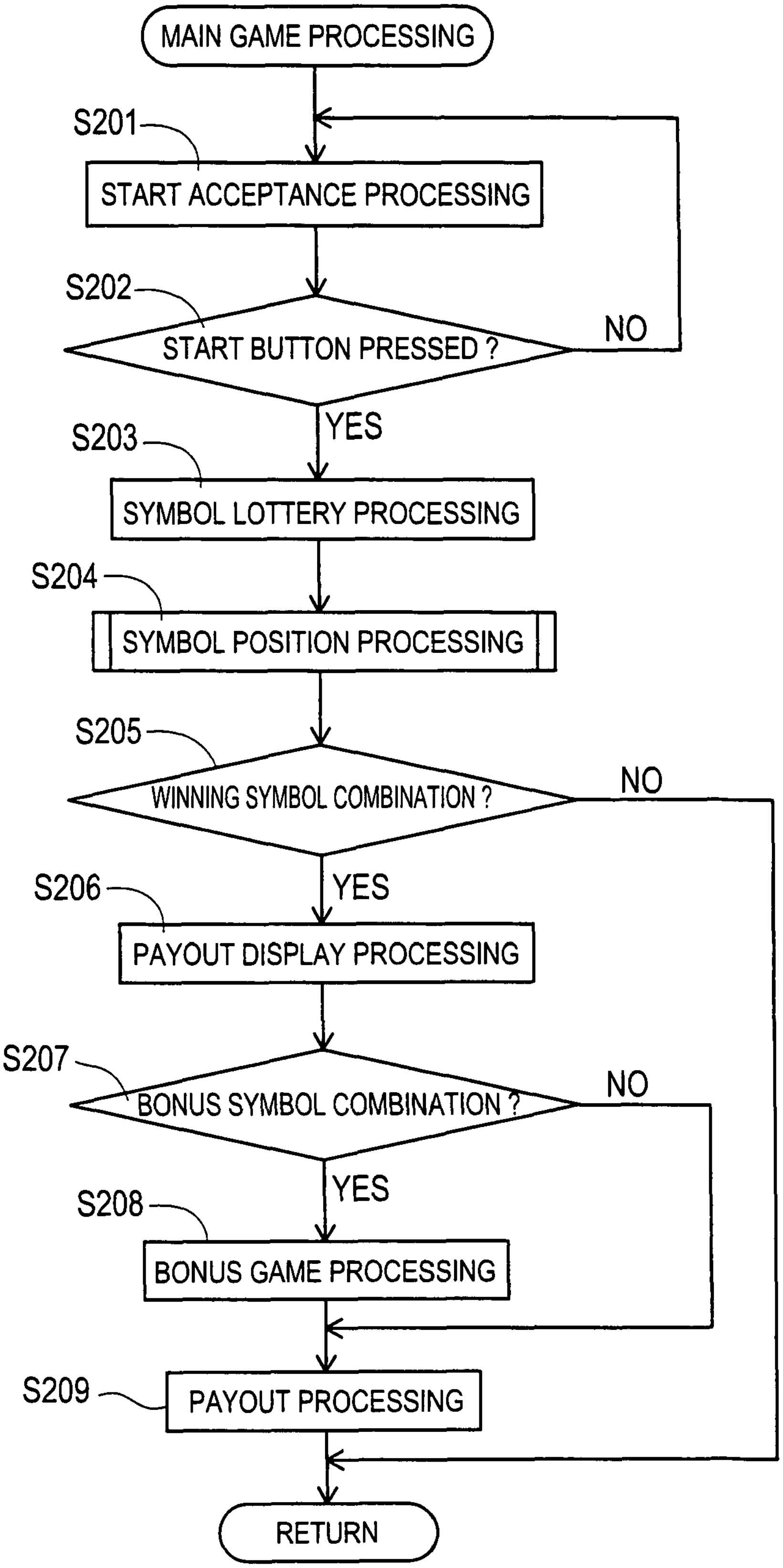
FIG. 15 is a flowchart of a main game processing program executed in the slot machine directed to the third embodiment.

Next, there will be described a slot machine directed to a third embodiment by referring to FIG. 14 through FIG. 16. It is to be noted that, in the following descriptions, numerals same as those of the slot machine 1 directed to the first embodiment depicted in FIG. 1 through FIG. 9 are assigned to similar or same structural portions of the slot machine directed to the second embodiment.

An outline construction of the slot machine directed to the third embodiment is almost same as that of the slot machine 1 directed to the first embodiment. Also, various control processing are almost same as those of the slot machine directed to the first embodiment.

The slot machine 1 directed to the first embodiment outputs an animation and sound effect when a symbol positioned in the symbol display frame 7 is dragged and dropped to the performance character, whereas the slot machine directed to the third embodiment outputs an animation effect and a sound effect when a symbol whose look is same as or similar to a symbol to be positioned in a predetermined location in a symbol display frame 201 is dragged and dropped to the performance character. In this regard, the slot machine directed to the third embodiment differs from the slot machine 1 directed to the first embodiment.

There will be described a feature of the slot machine directed to the third embodiment by referring to FIG. 14. FIG. 14 is a diagram for illustrating a feature of typical game developments directed to the third embodiment that may be encountered in accordance with the principles of the present invention. In the slot machine directed to the third embodiment, as shown in FIG. 14, the lower-side image display panel 6 displays: a symbol display frame 201 in which three symbols are positioned in a form of 1 row×3 columns matrix; and the volcano 28 which is a performance character. In this regard, in the symbol display frame 201, there are arranged three columns of symbol display regions each of which is to position one of many symbols depicted on a reel band of a reel. That is, one symbol display regions is assigned to each of three reels 202 through 204. In each of the symbol display regions, one of symbols depicted on respective reel bands of the reels 202 through 204 is positioned. Furthermore, a pay line L6 is provided on the symbol display frame 201 laid-out in the lower-side image display panel 6. Furthermore, various winning symbol combinations are previously defined.

In every base game carried out by the slot machine directed to the third embodiment, the start button is operated by a player to start a game. In case a winning symbol combination o or a one-symbol-different losing symbol combination in which only one of the symbols does not coincide with a certain winning symbol combination is to be positioned on the pay line L6, there will be displayed five cards (symbol characters) 211 through 215 with their symbol-character faces placed downward in the lower-side image display panel 6, at first. That is, predetermined symbols (e.g., "RED7", "CHERRY", "PLUM", and the like) are depicted on downward faces of the cards 211 through 215 and the depicted symbols are made indistinguishable since they are placed with their symbol-character faces downward. After that, in case a player drags and drops three of the cards 211 though 215 to the crater of the volcano 28, an animation effect to represent a volcanic eruption of the volcano 28 and a sound effect corresponding to a volcanic eruption sound of the volcano 28 are outputted, as shown in FIG. 14. At the same time, the three cards which are now turned over to make their symbols are distinguishable are moved from the crater of the volcano 28 to symbol display regions, and further on, the still-spinning-state reels 202 through 204 are stopped to position the three symbols 216, 217, and 218 in the symbol display regions. In case the cards 211 through 215 are dragged and dropped to an outside of the display, a warning sign and a warning sound are outputted.

Next, there will be described a subroutine concerning a main game processing to be carried out by the slot machine directed to the third embodiment by referring to FIG. 15. FIG. 15 shows a flowchart of a main game processing program to be executed in the slot machine directed to the third embodiment. It is to be noted that programs indicated in the flowchart are stored in the memory card 53, decompressed in the RAM 63, and executed by the controller 49.

After carrying out a predetermined initial setting, the controller 49 firstly carries out a start acceptance processing at S201 in which an inserted coin is accepted and the number of bets is set. At the start acceptance processing, there is carried out a processing to clear out some data set and stored in a certain data regions (e.g., prize number counter, and the like). Furthermore, at the start acceptance processing, a player is allowed to carry out bet operations such as inserting coins and setting the number of bets for a current game between 1-BET and 5-BET with the 1-BET button 21 and the MAX-BET button 22.

It is to be noted that, during the start acceptance processing, a symbol display frame 201 filled with three symbols repositioned in a preceding game and the volcano 28, the performance character, (see FIG. 14) are displayed in the lower-side image display panel 6.

Next, the controller 49 judges whether or not the start button 18 has been pressed at S202. For judging presence or absence of an input from the start button 18, the controller 49 detects whether or not to receive an input signal outputted from the start switch 18S.

In case the start button 18 is not pressed (S202: NO), the processing returns to the start acceptance processing (S201) again. Under this state, a player can change the number of bets or the like by operating bet buttons. In case the start button 18 is pressed (S202: YES), the number of bets is subtracted from amount of credits the player currently holds, and stored in the RAM 43 as bet information.

At S203, the controller 49 carries out a symbol lottery processing in which there are drawn and determined symbols to be repositioned in respective symbol display regions laid-out in the symbol display frame 201. To be more specific, the controller 49 executes a random number generating program included in the lottery program stored in the RAM 63. Thereby a random number values are extracted, and three symbols to be repositioned in the symbol display regions (i.e., stop positions of the reels 202 through 204) are determined from plural kinds of symbols by referring to the extracted random number value and the symbol lottery table.

Figure 16:
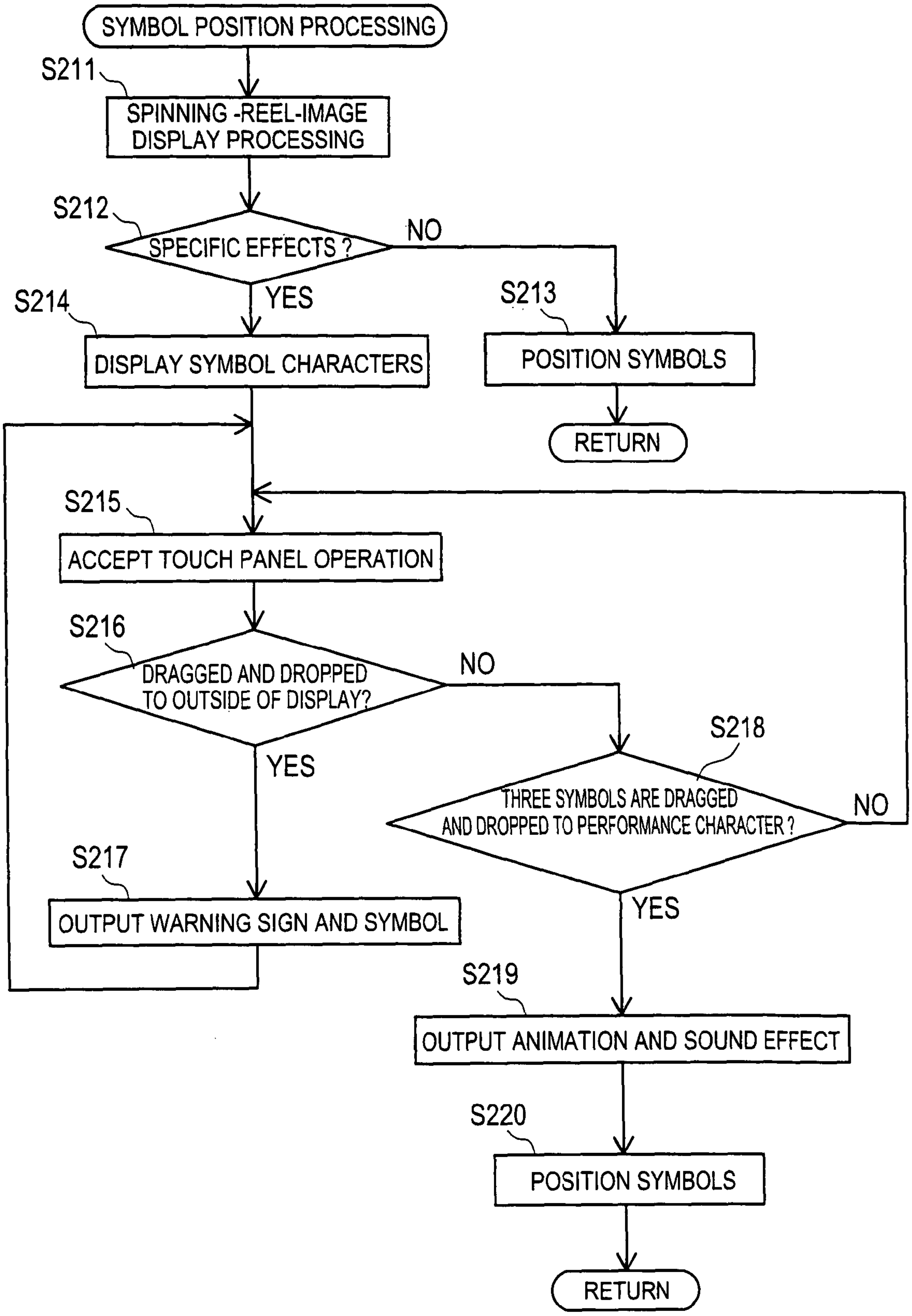
FIG. 16 is a flowchart of a symbol positioning processing program in the slot machine directed to the third embodiment.

At S204, the controller 49 carries out a symbol position processing to be described later (FIG. 16). At the symbol position processing, five symbol characters (cards 211 through 215) whose looks are same as or similar to a certain symbols are indicated with their symbols indistinguishable. After three of the five symbol characters are dragged and dropped to the performance character (the volcano 28), symbols are repositioned in the symbol display regions in accordance with a lottery result (see FIG. 14).

At S205, the controller 49 judges whether or not a combination of symbols positioned on the pay lines L6 set on the symbol display regions coincides with a winning symbol combination to which a prize is awarded.

In case a combination of symbols is judged as a winning symbol combination (S205: YES), the processing goes on to S206. In case it is judged as not a winning symbol combination (S205: NO), the main game processing is terminated. In case a new game is started continually to the preceding game, a series of processing to follow S201 is carried out.

At S206, the controller 49 notifies a player of contents of prizes by causing the lower-side image display panel 6 to indicate contents of prizes directed to the winning symbol combination detected at S205.

Next, at S207, it is judged whether or not a combination of symbols positioned on the pay line L6 set on the symbol display regions at the symbol position processing of S204 coincides with a bonus symbol combination which awards a bonus game. A combination of three "RED7" symbols on the pay line L6 corresponds to the bonus symbol combination, here.

In case it is judged that a combination of symbols on the pay line L6 coincides with a bonus symbol combination (S207: YES), the processing goes on to a bonus game processing (S208). There can be considered various mannered bonus games, however, details of a bonus game will be described provided that a free game is the bonus game. A free game is a predetermined number of games equivalent to base games and carried out without any bets. To be more specific, at the bonus game processing of S208, a predetermined number of symbol repositioning are repeated by making the reels 202 through 204 spin and prize(s) of winning symbol combination(s) in the predetermined number of symbol repositioning is awarded to a player at a prize processing of S209 to be described later. A bonus game may be made to occur in case a predetermined number or more of specific identical symbols are positioned. A bonus game may be made to occur suddenly as mystery or various conditions can be set to make a bonus game occur. Furthermore, of a lottery table to be used in a free game, prizes of winning symbol combinations may be set higher than ones set in a lottery table to be used in a base game. In case it is judged that a combination of symbols on the pay line L6 does not coincide with a bonus symbol combination (S207: NO), the processing goes on to S209.

At S209, the controller 49 awards a player a prize for a combination of indicated symbols. At this prize processing, a prize can be made with coins equivalent to amount of credits (1 credit per 1 coin) by pressing the CASHOUT button 20, or made with a bar-code ticket.

Next, there will be described a subroutine of the symbol position processing at S204 which is carried out in the slot machine directed to the third embodiment by referring to FIG. 16. FIG. 16 is a flowchart showing a symbol position processing program to be executed by the slot machine directed to the third embodiment. It is to be noted that programs indicated in the flowchart of FIG. 16 are stored in the memory card 53, decompressed into the RAM 63, and repeatedly executed by the controller 49.

Firstly, at S211, the controller 49 sends the graphic board 68 a start signal to start spinning of the reels 202 through 204. Upon receiving the start signal, the graphic board 68 carries out a spinning-reel-image display processing. That is, the graphic board 68 carries out display control to make the reels 202 through 204 start spinning virtually in the lower-side image display panel 6 so as to display symbol columns spinning at predetermined speed. After sending the start signal, the controller 49 determines effects to be carried out in a game (e.g., an image to be displayed in the upper-side image display panel 5 and a sound to be outputted from the speaker 69) and starts carrying out effects in accordance with the determined manner.

Next, at S212, it is judged whether or not a manner to use the cards 211 through 215 is selected as effects.

In case the manner to use the cards 211 through 215 is not selected (S212: NO), after a lapse of a predetermined time, a spinning-stopped-state reel image is sequentially displayed by the controller 49 in order of reel 202→reel 203→reel 204, whereby a symbol is exposed and repositioned in each of the reels 202 through 204 (S213). After that, the processing goes on to a judgment processing at S205.

In case the manner to use the cards 211 through 215 is selected (S212: YES), the controller 49 displays five symbol characters (cards 211 through 215) with their symbol-character faces placed downward to make them indistinguishable in the lower-side image display panel 6 on condition that predetermined symbols (e.g., "CHERRY"×3, "RED", and "PLUM") are at their downward faces at S214. It is to be noted that among the five symbol characters, there are included three symbols to be positioned in the symbol display regions, which has been determined in accordance with a lottery result at S203.

After that, at S215, the controller 49 accepts an operation done by a player with the touch panel 11. The controller 49 detects that one of the cards 211 through 215 positioned within the symbol display frame 201 is designated by a player's touch operation. This detection is made in accordance with a location signal from the touch panel 11. For example, as shown at a middle stage in FIG. 14, in case a player touches a location of the left-most card 211, the controller 49 detects that the card 211 is designated by the player.

At S215, the controller 49 also detects that a player keeps touching and moving (dragging) one of the cards 211 through 215 indicated in the lower-side image display panel 6. In case the controller 49 detects that a one of the cards 211 through 215 is being dragged, display control is carried out and in the lower-side image display panel 6, the designated card is displayed as if moving together with movement of a finger which touches the card, as shown at a middle stage of FIG. 14.

Further on, at S215, the controller 49 detects that the finger leaves (drops) the being-dragged card. Especially, in case the controller 49 detects that three cards have been dropped to the crater of the volcano 28, the performance character, an animation effect of erupting volcano 28 is outputted at the lower-side image display panel 6, as shown at a lower stage of FIG. 14. In addition, a sound effect corresponding to a volcanic eruption sound of the volcano 28 is outputted from the speaker 69.

Next, at S216, the controller 49 judges whether or not one of the cards 211 through 215 is dragged and dropped to the outside of the display, i.e., the outside of the lower-side image display panel 6. In case it is judged that one of the cards 211 through 215 is dragged and dropped to outside of display (S216: YES), a sign, "WARNIG!", is indicated in the lower-side image display panel 6 (S217). Furthermore, a warning sound which is an electronic sound is outputted from the speaker 69. After that, the processing goes on to a processing at S215.

On the other hand, in case it is judged that one of the cards 211 through 215 is not dragged and dropped to the outside of the display (S216: NO), the processing goes on to S218 and it is judged whether or not three cards have been dragged and dropped to the crater of the volcano 28 which is the performance character.

In case it is judged that three cards have been dragged and dropped to the crater of the volcano 28 (S218: YES), there is outputted an animation effect of erupting volcano 28 to the lower-side image panel 6 (S219). There is also outputted a sound effect corresponding to a volcanic eruption sound from the speaker 69 (S219). At the same time, three cards which are now turned over to make theirs symbols distinguishable are moved to the symbol display regions, and positioning of the three symbols 216, 217, and 218 directed to the three cards is carried out in accordance with the lottery result at S203 (S220).

It is to be noted that an animation effect and a sound effect outputted when three cards are dragged and dropped to the crater of the volcano 28 differs depending on winning symbol combination (i.e., prize value to be awarded). To be more specific, the animation and sound effect outputted when a winning symbol combination is positioned on the pay line L6 is more drastic than the ones outputted when a non-winning symbol combination is positioned on the pay line L6. Other than the above case, as to-be-awarded prize value of a winning symbol combination is higher, an animation effect and a sound effect to be outputted may be made more drastic.

In case it is judged that three cards are not dragged and dropped to the crater of the volcano 28 (S218: NO), the processing returns to S215.

As described, in the slot machine directed to the third embodiment, for starting a game, a player operates the 1-BET button 21 and the MAX-BET button 22, whereby the number of bets, between 1-BET and 5-BET, for a next game is accepted (S201). Consequently, the reels 202 through 204 start spinning. In case a manner to use the cards 211 through 215 is selected as effects, there are displayed plural symbol characters whose looks are same as or similar to certain symbols with their symbol-character faces placed downward after a lapse of a predetermined time (S214). In case three of the plural symbol characters are dragged and dropped to the crater of the volcano 28 which is the performance character, there are outputted an animation effect of erupting volcano 28 and a sound effect corresponding to an eruption sound (S219) and further on, symbols directed to the three symbol characters are positioned in symbol display regions. Thereby, new entertaining factors which conventional slot machines did not have inherently can be achieved. Furthermore, the controller 49 makes a player's operations intervene in a series of symbol-positioning control which prevents a game from getting monotonous. Furthermore, symbol-positioning control with this manner makes it possible to make the player feel as if a winning symbol combination is completed as a result of player's operations Furthermore, in case the cards 101 through 103 are dragged and dropped to the outside of a display, a warning sign is displayed and a warning sound is outputted (S217). Therefore, a player can carry out such special operation correctly with the aid of the warning sign and sound.

It is to be noted that the present invention is not restricted to the above-described embodiment but, not to mention, it can be variously improved and changed within the scope not departing from the subject matter thereof.

For example, in the first through third embodiments, the volcano 28 is used as performance character. However, other character may be used. In case an animal is used as a variant of the performance character, it is preferable to output an animation effect of an animal which eats a symbol or a symbol character dragged and dropped there. Furthermore, it is possible to change eating manners and animal's expression depending on dragged-and-dropped symbol and resultant symbol combination completed by a dragged-and-dropped symbol.

In the first embodiment, an animation and a sound effect are outputted when a specific symbol among symbols positioned in the symbol display regions 31 through 45, namely, a "RED7" symbol or a "BLUE7" symbol, is dragged and dropped to a performance character. An animation effect and a sound effect may be outputted even when a symbol other than the above specific symbols is dragged and dropped. In that case, it is preferable to output an animation effect and a sound effect which differs depending on symbol.

In the third embodiment, whichever three of five symbol characters may be selected for drag-and-drop operation by a player, a resultant combination of symbols positioned in the symbol character regions does not change. However, in a variant of the third embodiment, a resultant combination of symbols may change depending on selection of symbol characters done by a player.

What is claimed is:

1. A slot machine comprising:

a display for displaying plural symbols positioned and a performance character; and a controller programmed to operate with the display (a) to reposition the plural symbols in the display, (b) to award a prize in accordance with a combination of repositioned symbols, and (c) to output an animation effect when a repositioned symbol is dragged and dropped to the performance character.

2. A slot machine comprising:

a display for displaying plural symbols positioned and a performance character; and a controller programmed to operate with the display (a) to reposition plural symbols in the display, except a specific symbol to be positioned in a predetermined location, (b) to indicate at least one symbol character whose look is same as or similar to one of any symbols which can possibly be positioned in the display with a symbol of the at least one symbol character indistinguishable, (c) to output an animation effect when the at least one symbol character is dragged and dropped to the performance character, and to reposition the specific symbol in the predetermined location laid out in the display, and (d) to award a prize in accordance with a combination of repositioned symbols.

3. A slot machine according to claim 2, wherein the controller carries out a lottery to decide symbols to be repositioned in the display, and in case a result of the lottery is to position symbols which make up a winning symbol combination to which a prize is awarded, the controller repositions plural symbols of the winning symbol combination in the display, except a specific symbol to be positioned in a predetermined location, at the operation (a).

4. A slot machine according to claim 2, wherein the controller causes the display to indicate plural number of symbol characters in the display at the operation (b).

5. A slot machine comprising:

a display for displaying plural symbols positioned and a performance character; and a controller programmed to operate with the display (a) to reposition plural symbols in the display, except a specific symbol to be positioned in a predetermined location, (b) to indicate at least one symbol character whose look is same as or similar to one of any symbols which can possibly be positioned in the display with a symbol of the at least one symbol character indistinguishable, (c) to output an animation effect when the at least one symbol character is dragged and dropped to the performance character, and to indicate the at least one symbol character in the display with a symbol of the at least one symbol character distinguishable, (d) to move the at least one symbol character whose symbol is made distinguishable to the predetermined location, (e) to reposition the specific symbol in the predetermined location laid out in the display, and (f) to award a prize in accordance with a combination of repositioned symbols.

6. A slot machine according to claim 5, wherein the controller causes the display to indicate plural number of symbol characters in the display at the operation (b).

7. A slot machine comprising:

a display for displaying plural symbols positioned and a performance character; and a controller programmed to operate with the display (a) to carry out a lottery to decide symbols to be repositioned in the display, (b) in case a result of the lottery is to position symbols which make up a winning symbol combination to which a prize is awarded, to reposition plural symbols of the winning symbol combination in the display, except a specific symbol to be positioned in a predetermined location, (c) to indicate at least one symbol character whose look is same as or similar to one of any symbols which can possibly be positioned in the display with a symbol of the at least one symbol character indistinguishable, (d) to output an animation effect which differs depending on value of prize to be awarded when a specific symbol character whose look is same as or similar to the specific symbol is dragged and dropped to the performance character, and to indicate the specific symbol character in the display with a symbol of the specific symbol character distinguishable, (e) to move the specific symbol character whose symbol is made distinguishable to the predetermined location, (f) to reposition the specific symbol in the predetermined location laid out in the display, and (g) to award a prize in accordance with a combination of repositioned symbols.

8. A slot machine according to claim 7, wherein the controller causes the display to indicate plural symbol characters including the specific symbol character at the operation (c); and in case the specific symbol character included in the plural symbol characters is dragged and dropped to the performance character at the operation (d), the controller outputs an animation effect and causes the display to indicate the symbol character with a symbol of the symbol character distinguishable.

9. A slot machine according to claim 7, wherein the controller is further programmed to operate with the display:

(h) in case a result of the lottery is to position symbols which make up a one-symbol-different losing symbol combination in which only one of plural symbols does not coincide with a winning symbol combination, to reposition plural symbols of the one-symbol-different losing symbol combination in the display except a specific symbol to be repositioned in a predetermined location, (i) to indicate plural symbol characters whose looks are same as or similar to symbols other than the only one symbol which does not coincide with the winning symbol combination with symbols of the plural symbol characters indistinguishable, and (j) in case all of the plural symbol characters are dragged and dropped to the performance character, to reposition the specific symbol in the predetermined location laid out in the display.

10. A playing method of a slot machine in which a controller repeats a game to reposition plural symbols currently positioned in a display and a performance character is indicated in the display, the playing method comprising the steps of:

(a) repositioning the plural symbols in the display during the game with the controller;

(b) awarding a prize in accordance with a combination of repositioned symbols with the controller; and (c) outputting an animation effect with the game controller when a repositioned symbol is dragged and dropped to the performance character.

11. A playing method of a slot machine in which a controller repeats a game to reposition plural symbols currently positioned in a display and a performance character is indicated in the display, the playing method comprising the steps of:

(a) repositioning plural symbols in the display during the game with the controller, except a specific symbol to be positioned in a predetermined location;

(b) indicating at least one symbol character whose look is same as or similar to one of any symbols which can possibly be positioned in the display with a symbol of the at least one symbol character indistinguishable with the controller;

(c) outputting an animation effect when the at least one symbol character is dragged and dropped to the performance character, and repositioning the specific symbol in the predetermined location laid out in the display with the controller, and (d) awarding a prize in accordance with a combination of repositioned symbols with the controller.

12. A playing method of a slot machine according to claim 11 further comprising a step of (e) carrying out a lottery to decide symbols to be repositioned in the display with the controller, wherein in case a result of the lottery is to position symbols which make up a winning symbol combination to which a prize is awarded, the step (e) comprises a sub-step of repositioning plural symbols of the winning symbol combination in the display with the controller, except a specific symbol to be positioned in a predetermined location at the step (a).

13. A playing method of a slot machine according to claim 11, wherein the controller causes the display to indicate plural number of symbol characters in the display at the step (b).

14. A playing method of a slot machine in which a controller repeats a game to reposition plural symbols currently positioned in a display and a performance character is indicated in the display, the playing method comprising the steps of:

(a) repositioning plural symbols in the display during the game with the controller, except a specific symbol to be positioned in a predetermined location;

(b) indicating at least one symbol character whose look is same as or similar to one of any symbols which can possibly be positioned in the display with a symbol of the at least one symbol character indistinguishable with the controller;

(c) outputting an animation effect when the at least one symbol character is dragged and dropped to the performance character, and indicating the at least one symbol character in the display with a symbol of the at least one symbol character distinguishable with the controller;

(d) moving the at least one symbol character whose symbol is made distinguishable to the predetermined location;

(e) repositioning the specific symbol in the predetermined location laid out in the display with the controller; and (f) awarding a prize in accordance with a combination of repositioned symbols with the controller.

15. A playing method of a slot machine according to claim 14, wherein the controller causes the display to indicate plural number of symbol characters in the display at the step (b).

16. A playing method of a slot machine in which a controller repeats a game to reposition plural symbols currently positioned in a display and a performance character is indicated in the display, the playing method comprising the steps of:

(a) carrying out a lottery to decide symbols to be repositioned in the display during the game with the controller;

(b) in case a result of the lottery is to position symbols which make up a winning symbol combination to which a prize is awarded, repositioning plural symbols of the winning symbol combination in the display with the controller, except a specific symbol to be positioned in a predetermined location;

(c) indicating at least one symbol character whose look is same as or similar to one of any symbols which can possibly be positioned in the display with a symbol of the at least one symbol character indistinguishable;

(d) outputting an animation effect which differs depending on value of prize to be awarded when a specific symbol character whose look is same as or similar to the specific symbol is dragged and dropped to the performance character, and indicating the specific symbol character in the display with a symbol of the specific symbol character distinguishable with the controller;

(e) moving the specific symbol character whose symbol is made distinguishable to the predetermined location;

(f) repositioning the specific symbol in the predetermined location laid out in the display with the controller; and (g) awarding a prize in accordance with a combination of repositioned symbols with the controller.

17. A playing method of a slot machine according to claim 16, wherein the controller causes the display to indicate plural symbol characters including the specific symbol character at the step (c); and in case the specific symbol character included in the plural symbol characters is dragged and dropped to the performance character at the step (d), the controller outputs an animation effect and causes the display to indicate the symbol character with a symbol of the symbol character distinguishable.

18. A playing method of a slot machine according to claim 16 further comprising the steps of (h) in case a result of the lottery is to position symbols which make up a one-symbol-different losing symbol combination in which only one of plural symbols does not coincide with a winning symbol combination, repositioning plural symbols of the one-symbol-different losing symbol combination in the display except a specific symbol to be repositioned in a predetermined location with the game controller;

(i) indicating plural symbol characters whose looks are same as or similar to symbols other than the only one symbol which does not coincide with the winning symbol combination with symbols of the plural symbol characters indistinguishable with the controller; and (j) in case all of the plural symbol characters are dragged and dropped to the performance character, repositioning the specific symbol in the predetermined location laid out in the display with the controller.

* * * * *